(12) United States Patent
Wang et al.

(10) Patent No.: US 8,101,140 B2
(45) Date of Patent: Jan. 24, 2012

(54) STRUCTURED CATALYST BED AND METHOD FOR CONVERSION OF FEED MATERIALS TO CHEMICAL PRODUCTS AND LIQUID FUELS

(75) Inventors: Yong Wang, Richland, WA (US); Wei Liu, Richland, WA (US)

(73) Assignee: Battelle Memorial Institute, Richland, WA (US)

(\*) Notice: Subject to any disclaimer, the term of this patent is extended or adjusted under 35 U.S.C. 154(b) by 371 days.

(21) Appl. No.: 12/393,837

(22) Filed: Feb. 26, 2009

(65) Prior Publication Data

US 2009/0215911 A1    Aug. 27, 2009

Related U.S. Application Data

(60) Provisional application No. 61/031,452, filed on Feb. 26, 2008.

(51) Int. Cl.
*B01J 8/02* (2006.01)
*B01J 19/24* (2006.01)

(52) U.S. Cl. ........ 422/601; 422/602; 422/603; 422/198; 422/220; 422/222

(58) Field of Classification Search ................. 422/601, 422/602, 603, 198, 220, 222
See application file for complete search history.

(56) References Cited

U.S. PATENT DOCUMENTS

| | | | | |
|---|---|---|---|---|
| 4,088,671 A | \* | 5/1978 | Kobylinski | 518/715 |
| 4,335,023 A | \* | 6/1982 | Dettling et al. | 502/262 |
| 4,814,146 A | \* | 3/1989 | Brand et al. | 422/179 |
| 6,969,505 B2 | \* | 11/2005 | Tonkovich et al. | 423/648.1 |
| 7,045,114 B2 | \* | 5/2006 | Tonkovich et al. | 423/659 |

FOREIGN PATENT DOCUMENTS

WO    WO0031514 A1    2/2000

OTHER PUBLICATIONS

Kuipers, E. W. et al., Non-ASF Product Distributions Due to Secondary Reactions During Fischer-Tropsch Synthesis, Journal of Catalysis, 158, 1996, 288-300.
Goldman, A. S. et al., Catalytic Alkane Metathesis by Tandem Alkane Dehydrogenation-Olefin Metathesis, Science, 312, 2006, 257-260.
Khassin, A. A., Membrane Reactors for the Fischer-Tropsch Synthesis, Nata Science Series II: Mathematics, Physics and Chemistry, 191, 2005, 249-271.
Iglesia, E. et al., Selectivity Control and Catalyst Design in the Fischer-Tropsch Synthesis: Sites, Pellets, and Reactors, Advances in Catalysis, 39, 1993, 221-302.

(Continued)

*Primary Examiner* — Jennifer A Leung
(74) *Attorney, Agent, or Firm* — James D. Matheson

(57) ABSTRACT

The present invention is a structured monolith reactor and method that provides for controlled Fischer-Tropsch (FT) synthesis. The invention controls mass transport limitations leading to higher CO conversion and lower methane selectivity. Over 95 wt % of the total product liquid hydrocarbons obtained from the monolithic catalyst are in the carbon range of $C_5$-$C_{18}$. The reactor controls readsorption of olefins leading to desired products with a preselected chain length distribution and enhanced overall reaction rate. And, liquid product analysis shows readsorption of olefins is reduced, achieving a narrower FT product distribution.

14 Claims, 13 Drawing Sheets

OTHER PUBLICATIONS

Hilmen, A. M. et al, Fischer-Tropsch Synthesis on Monolithic Catalysts of Different Materials, Catalysis Today, 69, 2001, 227-232.

Cao, C., et al., Microchannel Catalytic Processes for Converting Biomass-Derived Syngas to Transportation Fuels, ACS Symposium Series 914, Oxford University Press, 2005, 273-284.

Liu, W. Ministructured Catalyst Bed for Gas-Liquid-Solid Multiphase Catalytic Reaction, AIChE Journal, 48, 2002, 1519-1532.

Liu, W., Multi-Scale Catalyst Design, Chemical Engineering Science, 62, 2007, 3502-3512.

Kapteijn, F., Fischer-Tropsch Synthesis Using Monolithic Catalists, Catalysis Today, 105, 2005, 350-356.

Hilmen, A. M. et al., Fischer-Tropsch Synthesis on Monolithic Catalysts With Oil Circulation, Catalysis Today, 105, 2005, 357-361.

Iglesia, E., Synthesis and Catalytic Properties of Eggshell Cobalt Catalysts for the Fischer-Tropsch Synthesis, Journal of Catalysis, 153, 1995, 108-122.

\* cited by examiner

Pathway I

Pathway II

STRUCTURED CATALYST BED AND METHOD FOR CONVERSION OF FEED MATERIALS TO CHEMICAL PRODUCTS AND LIQUID FUELS

This invention was made with Government support under Contract DE-AC0676RLO-1830 awarded by the U.S. Department of Energy. The Government has certain rights in the invention.

FIELD OF THE INVENTION

The present invention relates generally to methods for conversion of syngas feed materials to conversion products. More particularly, the invention relates to a monolithic-type structured catalyst, reactor, and method for synthesis of chemical products and liquid fuels that provide improved product selectivity, reactor throughput, and temperature control.

BACKGROUND OF THE INVENTION

Fischer-Tropsch synthesis is a surface-catalyzed polymerization process that uses $CH_x$ monomers, formed by hydrogenation of adsorbed CO, to produce hydrocarbons with a broad range of chain lengths and functionality. Total product yield decreases exponentially with chain length, forming a so-called Anderson-Shultz-Flory (ASF) distribution. A Schulz-Flory distribution is a distribution of compounds that is expressed by the Schulz-Flory "alpha" value. The Schulz-Flory distribution value ($W_i$) represents the probability of making the next higher carbon number from a given carbon number, as given by Equation [1]:

$$W_i = (1-\alpha)^{2i} \cdot \alpha^{(i-1)} \quad [1]$$

Here, (i) represents carbon number; ($\alpha$) is the Schulz-Flory distribution factor (so-called "alpha" number), which represents the ratio of the rate of chain propagation to the rate of chain propagation plus the rate of chain termination; and ($W_i$) represents the weight fraction of product of carbon number (i). Alpha numbers above about 0.9 are, in general, representative of wax-producing processes. The higher the alpha number—as it approaches 1.0—the more selective a process is for producing wax molecules. The term "wax molecule" refers to solid hydrocarbons with a straight chain carbon length greater than 28. Because ASF distributions are unselective toward middle distillates for all possible chain growth probabilities, enhancing yields to obtain products in the middle distillates range remains a great challenge. During the last two decades, efforts have been made to shift the ASF distribution to a narrow range. These efforts include, e.g., conventional upgrading, interconversion of alkanes via alkane methathesis (interconversion), and incorporation of membrane and reactive distillation into the design of FTS reactors.

Gas-to-liquid conversion such as Fischer-Tropsch (FT) type of synthesis is needed for production of liquid fuels and/or chemical feedstock from a variety of renewable energy and hydrocarbon sources in addition to fossil fuels. New and/or improved catalyst and reactor technologies are needed. FTS is a three-phase (gas-solid-liquid) reaction process, wherein hydrodynamic and mass transfer effects are very important. Even though reactants are in the gas phase, the pores of catalysts are filled with liquid products. Diffusion rates in the liquid phase are typically five orders of magnitude slower than in the gas phase, and even slow reactions may be diffusion limited in the liquid phase. With increasing transport limitations, the selectivity to $C_5^+$ will go through a maximum. The $C_5^+$ selectivity will increase as a result of the longer olefin residence times. On the other hand, increasing transport limitations will eventually result in CO depletion since hydrogen diffusion rate is much faster than that of CO, resulting in enhanced hydrogenations and lower selectivity to $C_5^+$. In addition, in conventional FTS, even if $C_5^+$ may be maximized, it is still necessary to upgrade/hydrocrack wax ($C_{30}^+$) in order to obtain valuable middle distillates. Implications from all these research findings are possibilities of optimizing mass transport limitations, which will reduce the chance of re-adsorption of olefins, therefore leading to a desired product chain length distribution and enhanced overall reaction rate within intra-pellet of catalyst particles.

Another important problem for gas-to-liquid conversion is formation of methane from syngas. Formation of methane is highly undesirable. Syngas is wasted as a result of methane formation. Methane is refractory compound. The methane byproduct has to be recycled back to the upstream of the syngas production process unit, such as gasification or steam-reforming reactor, to be cracked back into syngas. The resulting gas stream has to go through the gas clean-up and conditioning process steps. Thus, reprocessing or reusing of the methane byproduct is associated significant capital and operation costs. The other problem with formation of methane by product is generation of excessive amount of heat, which makes difficult to control the reaction temperature. Temperature control for gas-liquid conversion is critical, since the reactions involved are highly exothermic. Temperature control can be easily lost if reaction heat is not effectively removed from the catalyst. Without effective temperature control, desired gas-liquid conversion reactions can fail. The greater the reaction heat that is generated, the hotter the catalyst surface becomes, and ultimately, the faster the process reactions occur. Ultimately, uncontrolled reactions result in auto-catalytic reactions that generally produce methane gas and (solid state) coke.

Physical phases in an FT reactor are complex and can include gas, liquid hydrocarbon, water, and solid catalyst. Mass transfer is considered to be a very important factor that affects both activity and selectivity. Even though the syngas feed is in the gas phase, catalyst pores may be filled with liquid products. Diffusion rate in the liquid phase is typically 4 to 5 orders of magnitude slower than in the gas phase. Some reactions are also slow due to limited diffusion in the liquid phase. Impact of mass transport on reaction activity thus can be readily understood. However, impact of mass transport on product distribution has not been clearly elucidated due to complex reaction kinetics. Since the FT reaction is highly exothermic, heat transfer is also critical to product selectivity.

Catalyst pellet-loaded fixed-bed and fine catalyst particle-dispersed slurry reactors are often used to conduct FTS reactions. In a fixed bed, catalytic materials can be deposited in a thin outer layer of the catalyst pellet (i.e., "egg-shell" catalysts) to mitigate the pore-diffusion mass transport and selectivity problems. However, external mass and heat transfer, and hydrodynamics are difficult to control in pellet-loaded beds due to random stacking of individual particles and non-uniform contacting of catalyst surface/liquid product/gas reactants. For example, liquid products can be readily trapped among inter-particle voids due to capillary forces, resulting in only a fraction of the external surface of the catalyst pellet becoming accessible to gas reactants. In addition, point-to-point contact in packed pellet beds results in poor thermal conductivity for dissipation of reaction heat. In a slurry reactor, in principle, pore-diffusion mass and heat transfer and related activity and selectivity problems can be mitigated by using small catalyst particles. However, there are several problems associated with slurry beds and use of fine catalyst particles. For example, fine particles can easily agglomerate into large particles if solid loading is high. If solid loading is low, most of reactor space is wasted. And, separation of waxy FTS liquid products from catalyst fines becomes necessary to recover the catalyst, which is difficult to do. Active metal(s) in the catalyst can also be leached from the catalyst particles into solution, resulting in loss of activity. External mass transfer of the feed gas from large gas bubbles onto the surface of the catalyst particle through the liquid can be the rate-limiting step. Product back mixing in the slurry reaction can decreases efficiency of the reactor. Conducting FT reactions inside small reactor channels made of metallic material is a relatively new catalyst and reactor technology with promise to provide better control of mass and/or heat transfer. For example, coating catalysts onto metallic supports (e.g., planar aluminum plate) with small channels significantly narrows product distribution to smaller carbon numbers. However, coating catalysts onto metallic supports can be difficult and costly, and long-term durability is a concern due to de-lamination of the catalyst layer. Catalyst fines can be packed inside a small reactor channel. However, a high pressure can be required to maintain fluid flow through small reactor channels loaded with catalyst fines, which puts a severe limitation on applying bench-scale concepts to practical-size production reactors. Above all, fabrication and engineering of a large number of small reactor channels (<3 mm) can be very costly for large-scale reactor operation, because gas-to-liquid reaction is typically conducted at high pressures. More recently, ceramic monolith structures have been used for chemical reaction processing, particularly for gas/liquid/solid (G/L/S) multiphase reactions. However, catalytic bed and reactor technologies are generally specific to targeted applications and problems. Product selectivity, throughput, mass and heat transfer, and hydrodynamics are largely determined by the method that is used, i.e., how the catalyst is to be structured and operated. Yet, appropriate catalyst bed and reactor structures and flow conditions, those critical design and operation parameters for a catalytic conversion process, must be ascertained for application of gas-to-liquid catalytic reactions. Accordingly, new catalyst reactor designs and methods are disclosed that can provide better product distribution, higher throughput, better mass and heat transfer, and better operability.

SUMMARY OF THE INVENTION

The present invention defines a method, system and device for converting a ion of a feed material to a synthesis product by passing said feed material through a reaction zone is a structured monolith having a preselected number of catalyst containing channels defined therein at a superficial linear gas velocity below about 0.2 cm/sec. While a variety of various applications and alternative embodiments are provided it is to be distinctly understood that the invention is not limited thereto but may be alternatively embodied and reconfigured. In some embodiments of the invention, the feed material is a syngas and may include at least one gaseous reactant such as $H_2$, CO, $CH_4$, $C_2$, including combinations of these reactants. The structured monolith preferably has a density of channels in the range from about 100 cpsi to about 2000 cpsi. These channels also have a size in the range from about 0.5 mm to about 3 mm. Channel wall thickness (support plus catalyst coating) can be from about 25 µm to 500 µm. The catalyst coating thickness is about 0 to about 100% of the wall thickness. In some applications reducing agents such as hydrogen may be included with the feed material to assist in the transformation process. The catalyst is coated within the channels at a preferred thickness of from about 1 µm and about 200 µm. A pore size within the catalyst layer is preferred in the range from about 2 nm to about 2 µm, but is not limited thereto. In FT synthesis applications, in one embodiment, the FT catalyst has a preferred layer thickness of from about 15 µm to about 50 µm. In another embodiment, FT catalyst has a thickness of from about 2 nm to about 2 µm. The feed material is preferably directed through channels in the reaction zone of the structured monolith in a zig-zag flow path. Feed material can be passed though a porous membrane prior to entry within the catalyst channels, e.g., to provide a uniform distribution of the feed material into the reactor channels. The method also includes the step of reintroducing reacted feed material previously passed through the reaction zone of the reactor through the channels in the reaction zone to increase the yield of reaction products. The method also includes forming a liquid thin film of the feed material on the catalyst surface catalyst within the channels of the structured monolith (reaction zone) that promotes mass transfer between the feed material present in the channels and the catalyst surface. Mass transfer between the feed material in the channels and the catalyst surface can involve dynamic mass transfer. Preferred temperatures for Fischer-Tropsch synthesis includes a preselected conversion temperature in the reaction zone of from about 210° C. to about 235° C. The method also includes the step of wash-coating the channels with the catalyst to affix the catalyst in the channels of the structured monolith, giving the catalyst channels a preselected thickness of catalyst prior to introducing the feed gas material thereto. In one embodiment, FT synthesis products have a carbon number in the range from about C=5 to about C=18. In another embodiment, greater than 95 wt % of the FT synthesis products have a carbon number in the range from C=5 to about C=18. Preferred FT synthesis products include fuel products including, e.g., diesel products, gasoline products, and combinations thereof. In a preferred embodiment, the reactor is operated in a FTS mode at a temperature and flow rate that provides a moderate CO conversion level (less than 80%) such that the product yield includes synthesis products with a carbon number of between about C=5 and about C=18 is maximized. In another embodiment, the reactor is operated at CO conversion levels >90% so that un-converted syngas does not need to be recycled. In another embodiment, the reactor is operated in a once-through mode, which dramatically reduces costs associated with any coupled recycling system. The invention includes a method for conversion of a feed material (e.g., a syngas) to chemicals and/or liquid fuels. The method includes the steps of: passing a feed material (e.g., a syngas) through a monolithic-type structured catalyst bed that includes a catalyst coated onto reaction channels at preferred flow conditions; converting the feed gas over the catalyst coated on the channel wall into desired chemical and/or liquid fuels. Resulting products are flushed out of the reaction channels of the catalyst bed. The catalyst bed can be made by depositing a catalytic coating on a ceramic monolith substrate of desired geometric and material properties. The monolithic structured bed provides a 3-D thermal conduction network for transport of the reaction heat from the channel surface onto the reactor vessel wall. The catalyst coating thickness and pore structure can be fully engineered for targeted application problem to minimize the pore diffusion mass transfer and heat resistance. Without any mass and heat transfer resistance, for a given catalyst the reaction throughput is much determined by the loading of the catalyst mass inside the reactor. Thus, the net catalyst weight in the structured catalyst bed is preferably maximized. The catalyst coating is composed of various active catalyst materials including metals. For FTS reactions, for example, Co—Re catalyst supported gamma (γ)-alumina is preferred, but is not limited thereto. The monolithic-structured catalyst bed is hosted in a reactor pressure vessel with the exterior surface of the reactor vessel being cooled by a fluid to take away the heat generated from exothermic reactions. Examples of cooling fluids include, but are not limited to, e.g., silicone oil, steam, water, inert gases, air, and combinations of these cooling fluids. In one embodiment, the reactor vessel is of a tubular form with an inner diameter of from about 0.5 inches to about 2 inches. In another embodiment, the reactor vessel is of a planar form that includes a spacing of from about 0.5 inches to about 10" inches. In the planar reactor design, each catalyst bed zone is sandwiched between a cooling panel. In a preferred design, the planar reactor design includes a structured catalyst monolith catalyst module with straight, ordered channels that define reaction cells therein. In one embodiment, channels are positioned with open ends of the channels oriented along the thickness dimension of the structured monolith. The feed gas or material is introduced into the reaction zone (channels of the structured monolith) from one side of the catalyst bed, is subsequently distributed uniformly over the catalyst bed surface through a porous membrane that is placed at one side, or on both sides of, the catalyst bed. The flow path then makes an about 90 degree of turn where it flows into (reaction) channels of the structured catalyst where conversion of the feed material occurs. Reaction products flow out of the reactions channels, make another about 90 degree turn and exit the reaction zone of the reactor from another side of the structured catalyst bed. In the exemplary design, a gap between the inner wall of the reactor vessel and the catalyst bed in the entrance side is about 0.5 mm to about 2 mm. The ratio of the gap (thickness) to the catalyst bed thickness is about 0.05 mm to about 0.2 mm, but is not limited thereto. The gap between the reactor vessel inner wall and the catalyst bed on the exit side of the reactor is about 0.5 mm to about 2 mm. Or, the ratio of the gap (thickness) to the catalyst bed thickness, e.g., on the exit side of the reactor is about 0.05 mm to 0.2 mm. This design dramatically increases the cross-sectional area the feed gas traverses through the catalyst bed compared to axial flow. A gas superficial linear velocity is obtained that provides a large volume of gas flow through the catalyst bed. Feed material can be introduced at an opening located at a first end of a first channel. Reaction or synthesis products exit the channel at an opening located at the opposite (or second opening at the opposite) end of the channel, where reaction products are collected. Feed material that exits the first channel at an exit end is introduced at the opening of a second channel positioned adjacent to the first channel but at an end opposite that of the first channel. Continued and subsequent reaction of the feed material occurs in subsequent channels. Feed material traverses the length of the second channel in a direction that is opposite that traversed (or to the direction of flow) in the first channel. Feed material continues this zig-zag, or back and forth flow path through other channels in the reaction zone (i.e., structured monolith) of the reactor or until the reactor is shut down. Feed gas or material is preferably fed through the catalyst bed in the structured monolith in a direction that is parallel to the gravity direction.

BRIEF DESCRIPTION OF THE DRAWINGS

A more complete appreciation of the invention will be readily obtained by reference to the following description of the accompanying drawing in which like numerals in different figures represent the same structures or elements.

DETAILED DESCRIPTION OF THE INVENTION

The present invention is a method and structured catalyst bed, reactor, and method for carrying out, e.g., Fischer-Tropsch synthesis (FTS). Multi-scale design concepts are disclosed that effectively integrate catalyst structures with reactor design features that achieve better catalytic reaction activity, selectivity, and stability. A modular-type reactor design is also disclosed that allows scale-up, and provides a simplified process flow that overcomes processing capacity and scale-economy problems found in conventional reactor technologies. Feasibility of proposed fundamental designs is demonstrated in laboratory-scale FTS tests. The present disclosure further details how control of hydrodynamic flow (mixture of gas/liquid feed compositions) and other conditions impact product selectivity. Such an understanding provides guidance to the design, construction, and operation of monolithic FTS catalyst reactors for applications on an industrial scale. While the present invention is described herein with reference to the preferred embodiments thereof in conjunction with Fischer-Tropsch Synthesis, it should be understood that the invention is not limited thereto, and various alternatives in form, detail, and types of synthesis reactions may be made therein without departing from the scope of the invention.

Figure 1:
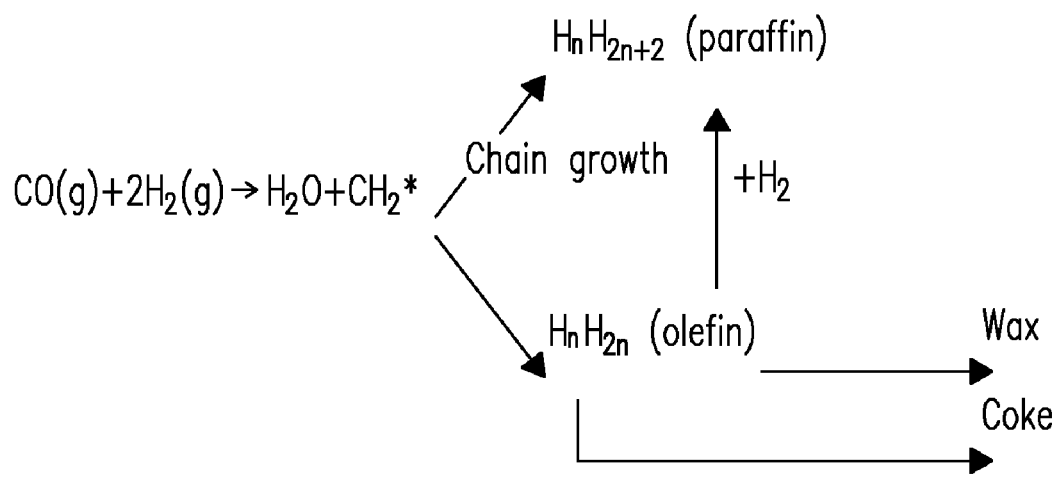
FIG. 1 shows two reaction pathways (I and II) for conversion of a feed gas material to synthesis products.
Figure 1:
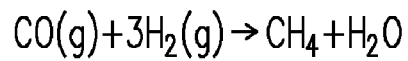

FIG. 1 is a schematic that shows two reaction pathways (I and II) for conversion of a feed gas comprised of carbon monoxide (CO) and hydrogen ($H_2$) that correlate with observations described herein. In scheme (I), CO and $H_2$ combine to form paraffins and olefins that further react to form waxes or foul to form coke. In reaction scheme (II), CO and $H_2$ combine to form methane ($CH_4$). Results obtained with structured catalyst reactors described hereafter can be rationalized by the reaction pathways shown in FIG. 1. In reaction scheme (I), paraffins and olefins are primary products that result from FT polymerization reactions on the structured catalyst surface. Olefins are active species and can cause several secondary reactions. For example, olefins produced in a primary reaction can further hydrogenate to form paraffins, which can grow subsequently into waxy, heavy components. Still longer chain growth products can ultimately lead to coking in the reactor. In reaction scheme (II), which parallels the polymerization reaction, CO can react with $H_2$ to form methane. For a given catalyst composition, relative reaction rates of these competing reactions are affected by mass transfer and heat transfers inside the catalyst, and between the bulk fluid and the catalyst.

Flow Conditions

Flow conditions for a feed gas or material introduced to a reactor is given by the Superficial Linear Gas velocity ($V_g$), defined in Equation [1], (cm/sec) as follows:

$$V_g = \frac{G_F \cdot (T + 273)}{P \cdot 273 \cdot SA} \quad [1]$$

Here: ($V_g$) is the feed gas superficial linear velocity (cm/s); (GF) is the feed syngas flow rate (ST cc/s); (T) is the average reactor temperature (° C.); (P) is the average reactor pressure (bar); and (SA) is the surface area of the catalyst bed that is exposed to the incoming feed gas. A preferred gas linear velocity used in conjunction with the present invention is <0.2 cm/s, but is not limited thereto. Gas linear velocity is a critical design and operating parameter to determine flow pattern inside the catalyst channel, gas/liquid product/catalyst surface contacting efficiency. Ideally, the surface of the catalyst is covered by a thin layer of dynamic liquid thin film. For a given structured catalyst channel and reaction conditions (temperature and pressure), the gas superficial linear velocity is a primary controlling parameter to formation and distribution of the liquid-phase product on the catalyst external surface. Full coverage of the catalyst external surface is thought to minimize "dry spots" and dry spots can cause fast gas-phase reaction such as methane formation. Thin liquid film favors for mass transfer between the bulk fluid inside the channel and the catalyst surface. The dynamic film means that the produced liquid product can be timely flushed out of the catalyst surface. The stagnant liquid phase is thought to cause side reactions such as un-controlled polymerization chain growth and coking.

Flow Fields

Flow fields and types of phased flow for introduction of feed materials (e.g., feed gas) into the structured monolith catalyst module in the reactor are not limited. Exemplary flows of a two-phased feed material within the channels of the structured catalyst module in the reactor include, but are not limited to, e.g., dispersed bubble flow; bubble flow; elongated bubble flow; Taylor flow; churn flow; slugging flow; annular flow; and mist flow. No limitations are intended. The structured catalyst reactors described herein change the hydrodynamics (conditions associated with mixing and flow), and external heat and mass transfer associated with FTS synthesis reactions.

Structured Catalyst System and Reactor

Figure 2:
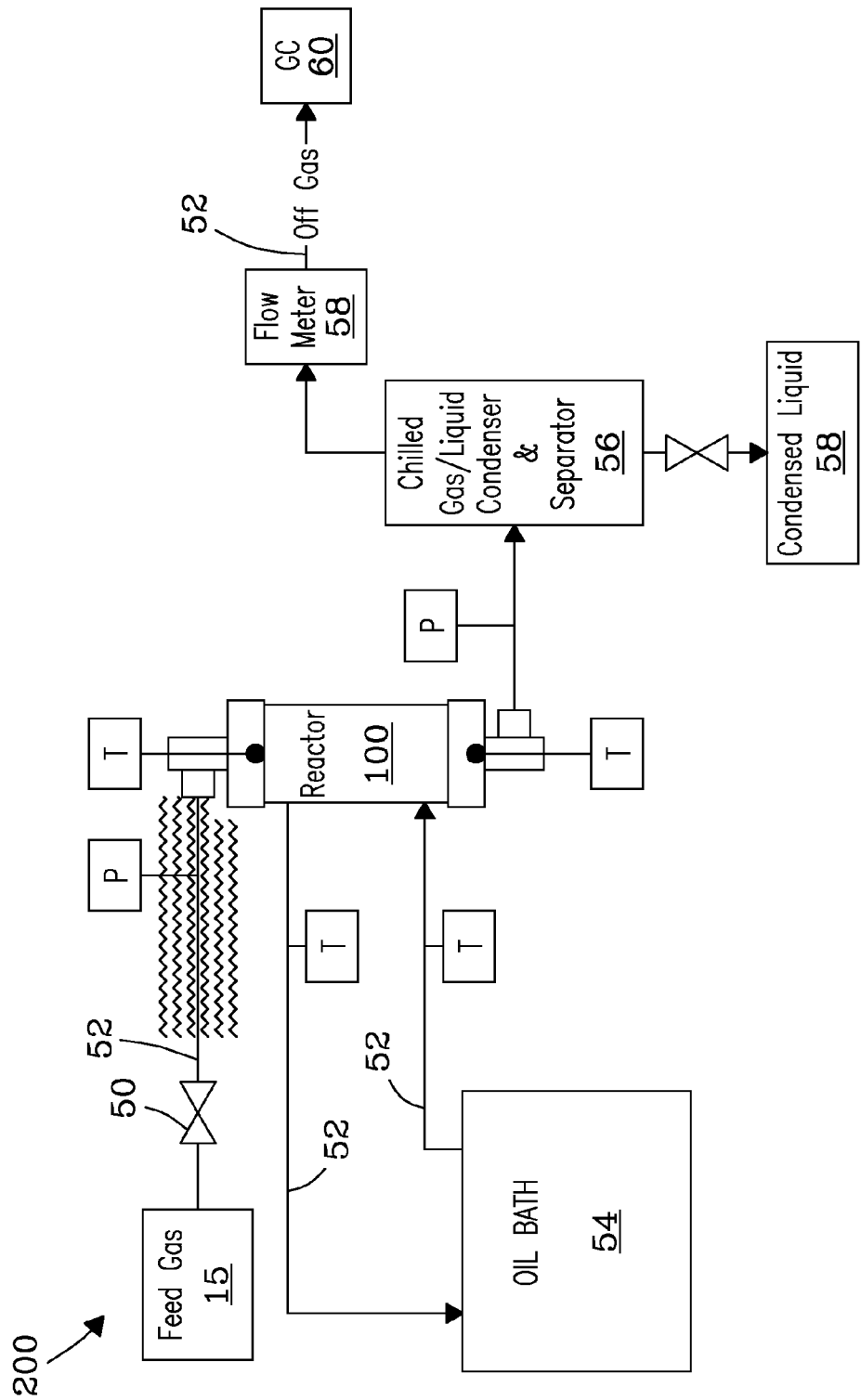
FIG. 2 is a schematic that shows exemplary components and a process flow used in conjunction with the invention.

FIG. 2 shows an exemplary catalyst reaction system 200. System 200 includes a structured catalyst reactor 100. Mass-flow controller 50 delivers feed gas 15 at a preselected rate through feed gas line 52 to reactor 100. Feed gas line 52 can be heated. System 200 includes an oil source 54 (e.g., an oil bath) that provides and circulates oil to reactor 100 to control temperature of the reactor. Reaction products 18 produced in the reactor are condensed in a gas-liquid condenser/separator 56 and collected. Aliquots of reaction products 18 may be taken from condenser 56 and delivered for analysis in an analytical instrument 60, including, e.g., a gas-chromatograph 60. A flow-meter 58 measures rate of flow and volume or quantity of the liquid aliquot for mass-balance and other calculations. While an exemplary flow diagram is shown, the system is not limited thereto. All components as will be envisioned and/or used by those of skill in the art are within the scope of the invention.

Structured Catalyst Reactor

Figure 3:
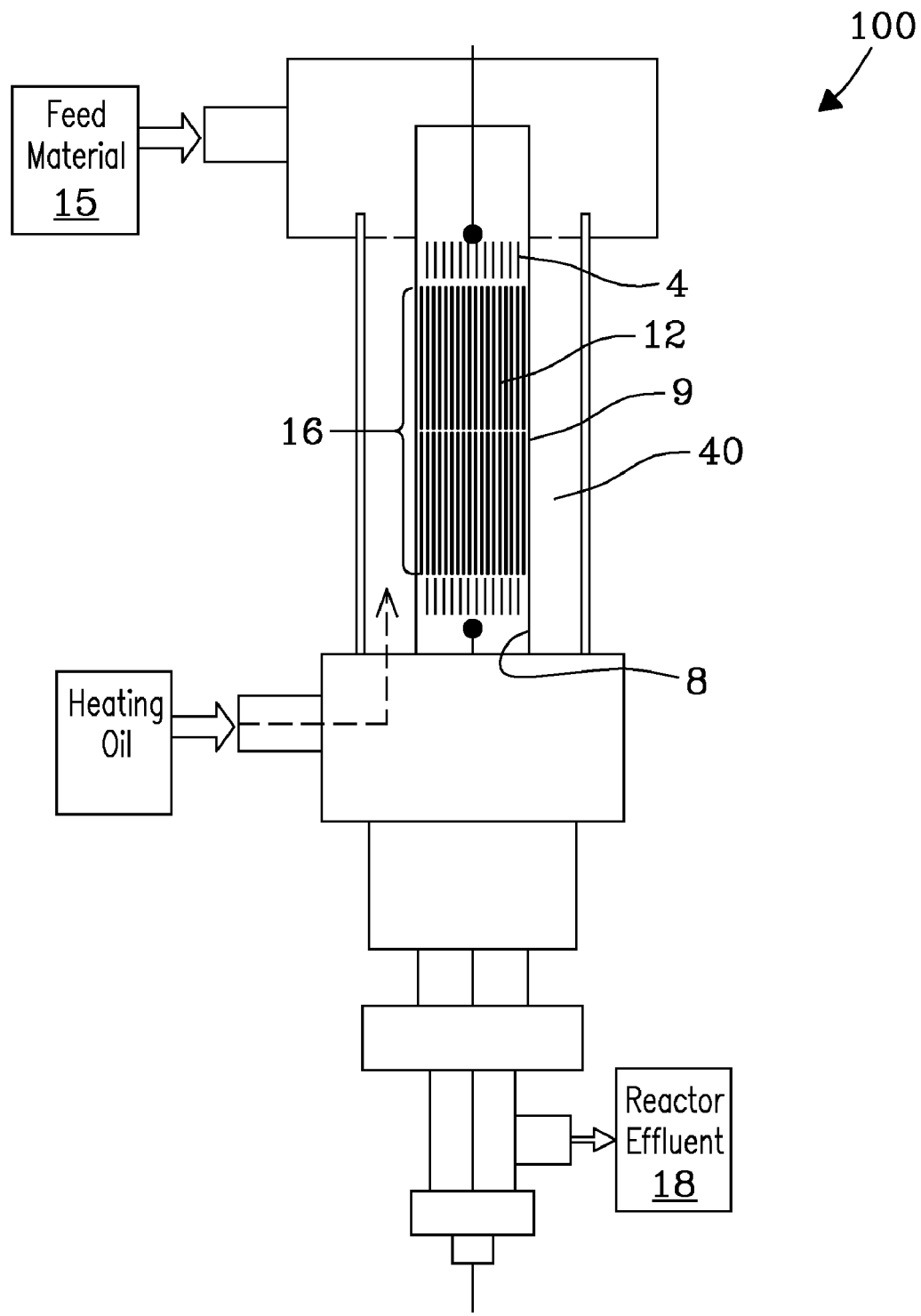
FIG. 3 is a cross-sectional view of a structured monolith catalyst reactor used in conjunction with the invention.
Figure 4A:
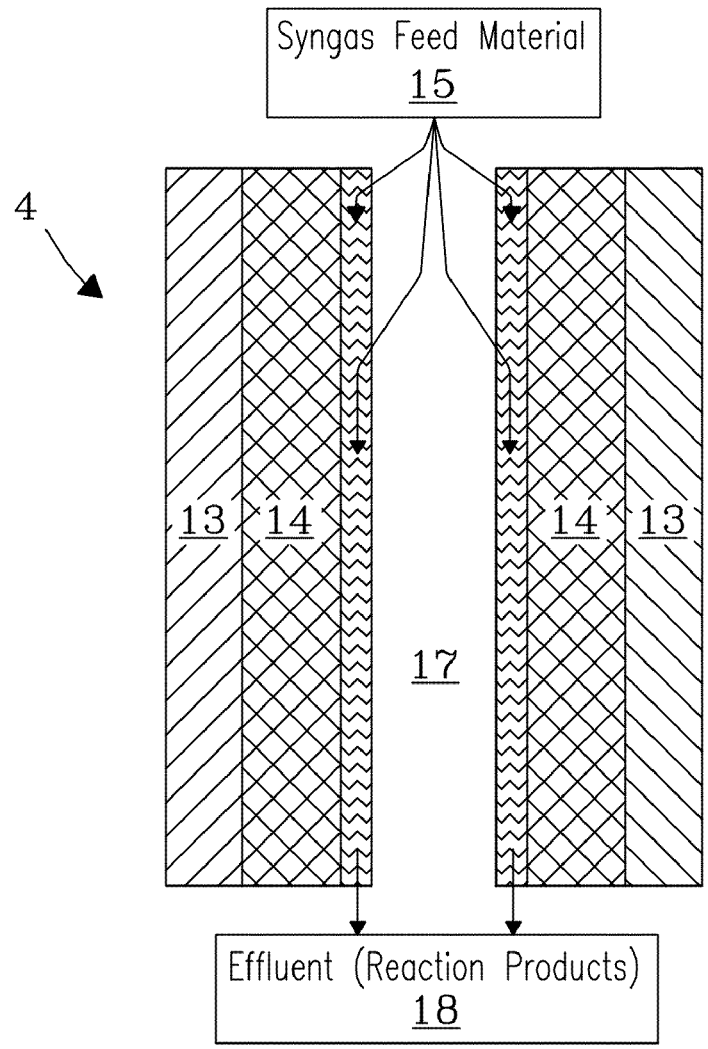
FIG. 4a is a cross-sectional view (length-wise) through a single reaction cell in the structured monolith catalyst module.

FIG. 3 shows a cross-sectional view of an exemplary catalyst reactor 100 according to an embodiment of the invention. The reactor is of a down-flow design that includes a catalyst module 10 that is comprised of a structured monolith 12. In the figure, illustrative dimensions of the reactors are shown, but the invention is not limited thereto. The monolith is preferably made of a ceramic (e.g., cordierite) that includes a preselected density of reaction cells 4 with open-ended channels (FIG. 4a). Density of reaction cells and channels are not limited. The collection of active reaction cells and channels in the catalyst module constitute a reaction zone 16 that provides for conversion of a feed gas, fluid, or other feed material to selected reaction products. In the instant embodiments, catalyst module 10 is installed at the center of reactor 100, but is not limited thereto. In the figure, a gap 8 located between the structured monolith 12 and the reactor wall 9 can be sealed, e.g., using a ceramic wool or another suitable sealant (e.g., a ceramic cement or other sealant), to minimize pooling of liquids, or by-pass of feed material 15, but is not limited thereto. In the instant design, feed gas 15 or feed material 15 is introduced at the top of the reactor, which flows through structured monolith 12, where the synthesis reactions occur. Reaction products 18 (e.g., in the effluent) exit from the bottom of the reactor, but recovery is not intended to be limited thereto. Temperature control and modulation in the reactor is provided by an oil jacket 40 that surrounds the reactor tube, and circulates temperature modulation oil (not shown) (e.g., silicone oil), but is not limited thereto. The structured monolith catalyst reactor of the invention offers other advantages that includes a low pressure drop through the catalyst, and a high gas-liquid mass transfer rate (i.e. in a two-phase flow), which is achieved by maintaining a dynamic, liquid thin film on the surface of the channel. The mass transfer rate between the bulk fluid and catalyst external surface is inversely proportional to the thickness of the film. The structured monolith reactors described herein also offer additional advantages that include a plug-flow pattern, which minimizes backmixing of reaction products, and also minimizes associated secondary reactions, which enables high, one-pass conversion rates.

For FTS reactions that produce fuels, product distribution is preferably in the gasoline to diesel (C5-C18 carbon number) range, which is achieved by controlling: 1) internal mass transfer (i.e., mass transfer between the liquid phase and the catalyst surface), which is achieved by changing thickness and pore sizes of the catalyst layer on the channel wall; and 2) hydrodynamics (i.e., proper gas/liquid mixing) external to the catalyst layer, which is achieved by controlling flow conditions (e.g., feed gas superficial linear velocity) inside the channels and geometries of the channels, which minimizes chain length during polymerization and yields desired products of an intermediate chain length. Gaps and voids in the reactor can lead to pooling. Pooling is to be avoided, given that non-moving (stagnant) fluids (gases or liquids) can lead to growth of longer chain polymers (i.e., via secondary reactions) with eventual formation of waxes. When the structured monolith is inserted into the reactor tube, some void spaces exist between the monolith exterior and the reactor tube wall since there are many partial channels on the exterior of a core-drilled monolith piece. Liquid-phase reaction products can accumulate in such voids and form a stagnant liquid phase because the gas linear velocity near the tube wall surface is very slow. Since the exterior partial channels of the monolith piece are all catalyzed, product molecules in the stagnant liquid can continue to react and form wax. Formation of wax can be attributed to secondary reactions that lead to chain growth within stagnant liquids because of prolonged residence time of primary reaction products. Wax formation is minimized if FTS reactions are confined within the coated channels of the structured monolith. More C5-C18 hydrocarbons are formed when stagnant liquids are minimized, which reduces wax formation.

Figure 4B:
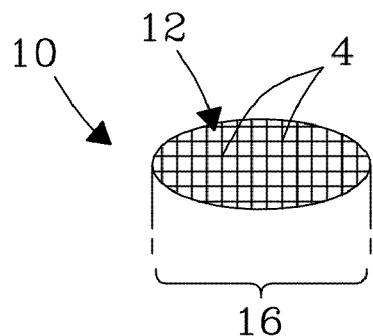
FIGS. 4b-4c present cross-sectional (top) views showing exemplary shapes for the catalyst module used in conjunction with structured catalyst reactors described herein.
Figure 4C:
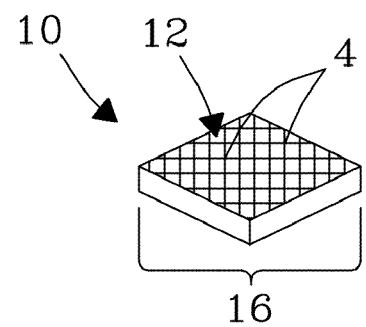

FIG. 4a is a cross-sectional view of a single reaction cell 4 in structured monolith 12 used in conjunction with catalyst reactors described herein. Reaction cell 4 is bounded by an external wall 13 (e.g., a ceramic wall of the ceramic monolith) that surrounds open-ended channel 17 therein. In the figure, channel 17 is shown coated with a selected catalyst 14 (e.g., a Fischer-Tropsch Synthesis (FTS) catalyst) of a preselected thickness that defines a layer 14. Various procedures described in the Examples herein may be used to introduce and affix the catalyst layer in the channels of the structured catalyst module (see FIGS. 3, 4a-4b). Thickness of the catalyst layer is preferably in the range from about 15 microns to about 50 microns, but is not limited thereto. Contributions to mass and heat transfer can be considered negligible at these catalyst thicknesses. Thinner layer thicknesses (<50 um) reduce the catalyst loading, while thicker (>200 um) layer thicknesses can causes mass transfer and pore-diffusion problems. Pore-diffusion, as defined herein, refers to diffusion whereby reactants and/or product molecules diffuse from the external surface of the catalyst into inner pores located in the catalyst layer. In an exemplary configuration, the reactor is loaded with an FTS catalyst 14, e.g., a Co—Re catalyst 14, but is not limited thereto. In the structured catalyst reactors described herein, this exemplary catalyst minimizes the wide range of products [i.e., light fuels (e.g., naptha) to heavy waxes] that are typical of conventional FTS synthesis, primarily by avoiding formation of heavy and waxy components from polymerization reactions at moderate CO conversion levels (<75%). At high, one-pass CO conversion levels (e.g., >90%), reactor designs of the present invention minimize the selectivity toward methane formation by using a suitable flow or flow condition and generating a desired flow pattern inside the channel, which shifts the FTS products 18 obtained to a narrow product distribution. Product distribution is preferably in the gasoline to diesel range, i.e., C5 to C18 range, but is not limited thereto. In exemplary tests, results demonstrate that ~92% to ~98% of the CO conversion occurs in one-pass through a channel of the monolith catalyst reactor. Results further show that under typical FTS reaction conditions, the structured monolithic catalyst reactors exhibit a $CH_4$ selectivity of less than about 10%, as described further herein. FIGS. 4b-4c are cross-sectional (top) views showing exemplary shapes for catalyst module 10 used in conjunction with structured catalyst reactors described herein. In FIG. 4b, catalyst module 10 is of an oval shape and includes structured monolith 12 that includes individual reaction cells 4 therein. In FIG. 4c, catalyst module 10 is of a square shape and also includes a structured monolith 12 with individual reaction cells 4 therein. Shapes and sizes of the structured monolith are not intended to be limited. For example, shapes include, but are not limited to, e.g., ovals, circles, octagons, oblongs, squares, and rectangles at varying diameters and thicknesses. The collection of active reaction cells 4 and channels (not shown) in catalyst module 10 constitute reaction zone 16 that provides for conversion of a feed gas, fluid, or other feed material to selected reaction products.

Figure 5B:
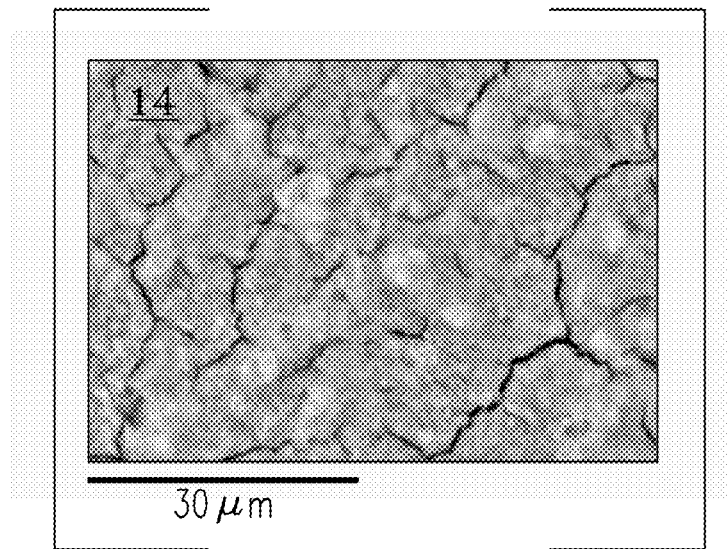
FIG. 5b shows an expanded view of the surface of catalyst layer.
Figure 5A:
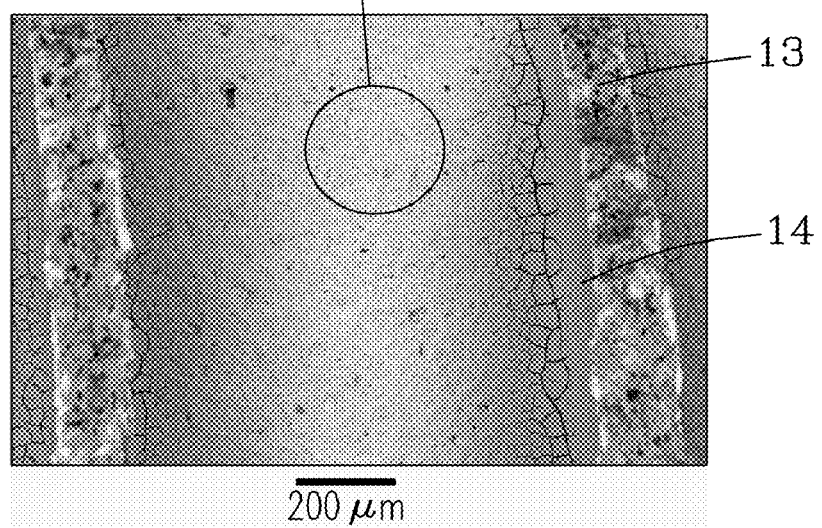
FIG. 5a is an electron micrograph that shows catalyst layer and wall of the structured monolith used in the catalyst reactor of the invention.
Figure 5C:
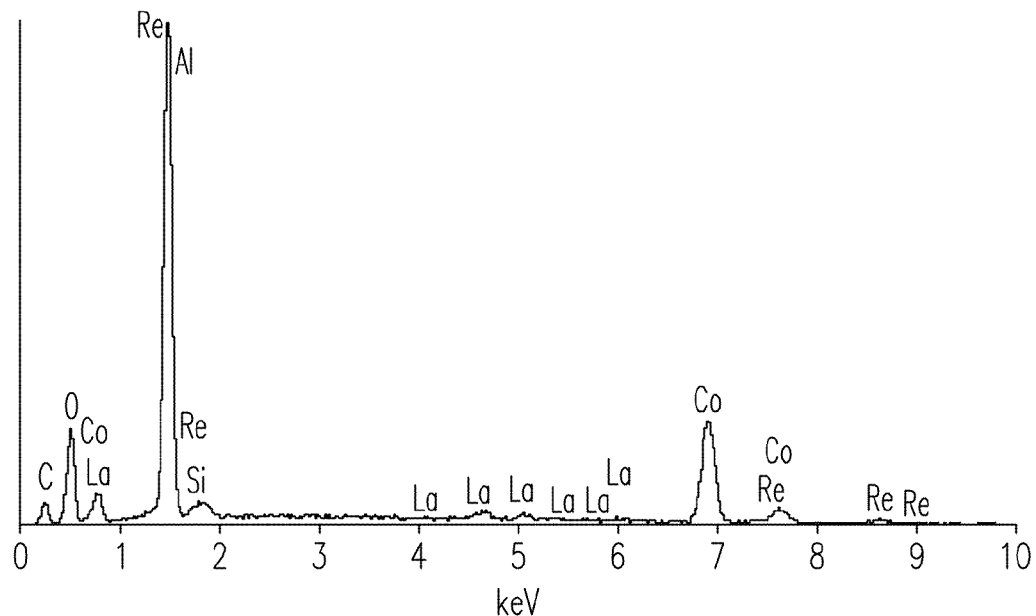
FIG. 5c is an electron dispersion spectroscopy (EDS) plot that shows the composition of the catalyst layer affixed to channels of the structured monolith.

Affixing Catalyst in Channels of Structured Monolith in the Catalyst Module of the Reactor Various methods can be used to affix the catalyst in the channels of the structured monolith in the catalyst module. In one method, catalyst powder is ball milled in a solution (e.g., a water-based solution), which forms a slurry. Slurry is introduced (e.g., under pressure) into the channels of the pre-dried monolith (e.g., for a few minutes) to form the coating layer. Excess slurry is removed from the channels, e.g., using forced air, and the wet monolith is dried, e.g., at 120° C. A preferred method for applying (affixing) the catalyst is a 2-step "washcoating" process detailed by Liu et al. [*Catalysis Today*, 140 (2009) 142-148], which reference is incorporated herein in its entirety. In a first step, channels of the structured monolith are coated with a slurry of γ-alumina powder that contains particles of a preselected particle size. In a $2^{nd}$ step, the coated monolith (with affixed, dried slurry) is washed (e.g., soaked) in a solution containing the catalyst metal(s), which impregnates the slurry coating with the active catalyst metals. After wetting, the coated and impregnated monolith is dried. FIG. 5a is an electron micrograph that shows catalyst layer 14 (e.g., FTS catalyst) and wall 13 of the structured monolith used in the catalyst reactor of the invention. FIG. 5b shows an expanded view of the surface of catalyst layer 14. FIG. 5c is an electron dispersion spectroscopy (EDS) plot that shows the composition of the catalyst layer affixed to the channel surface of the structured monolith. Active metals in the FTS catalyst are also identified. The plot shows that the channels of the structured monolith in the catalyst module are covered by the catalyst coating. Results confirm both the composition of the FT catalyst, and that the FT catalyst is affixed to the surface of the structured monolith.

Modular Reactor Design

Figure 6:
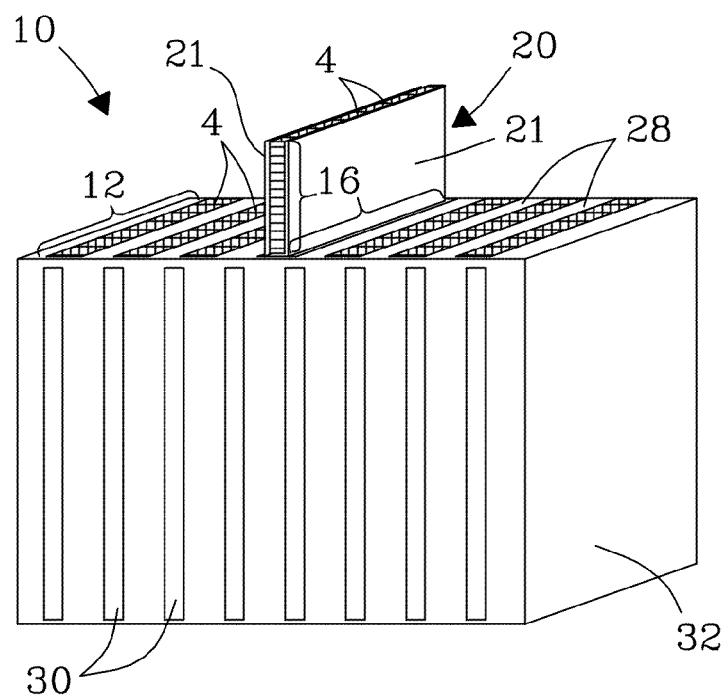
FIG. 6 presents a perspective view of a structured catalyst module 10, according to another embodiment of the invention.

FIG. 6 presents a perspective view of a structured catalyst module 10, according to another embodiment of the invention. In the instant embodiment, catalyst module 10 is of a multi-scale engineered modular design that incorporates one or more (catalyst module) inserts 20 that each include a structured monolith 12 with respective reaction cells 4 that contain channels (see discussion, FIG. 4a) that include a layer of a catalyst (e.g., an FTS catalyst). The collection of active reaction cells and channels in the catalyst module constitute a reaction zone 16 that provides for conversion of a feed gas, fluid, or other feed material to selected reaction products. The channels (FIG. 4a) in the structured monolith inserts are preferably oriented with the length along the thickness dimension of the insert, but are not limited thereto. Inserts 20 of the instant modular design provide for easy and quick replacement of spent catalyst in the catalyst reactor, an advantage for continuous operation. In the instant configuration, catalyst inserts 20 have a thickness of from about 1 cm to about 20 cm, which aides heat transfer, but dimensions are not limited thereto. Width and length dimensions are selected that accommodate the reactor design dimensions, and thus are not limited. In the figure, catalyst inserts 20 are shown sandwiched between cooling panels 28 that provide cooling to, or that modulate temperature of, exterior (face) surfaces 21 (e.g., front, side, and rear faces) of insert 20, and thereby provide temperature control to the reactor. Cooling channels 30 that extend through the exterior surface 32 or housing 32 of the catalyst module 10 allow for introduction of a cooling fluid (e.g., air or another cooling liquid) to cooling panels 28 that are in contact with the catalyst module inserts 20. Cooling channels 30 remove excess heat generated in reaction zone 16 of catalyst module 10 of the reactor. In an exemplary catalyst module insert design, structured monolith inserts are sandwiched between cooling panels 28 made of porous metal sheets, but is not limited thereto. In the instant embodiment, catalyst module inserts 20 have a thickness (height) of about 1 cm to 15 cm, a length (L) of about 2 meters, and a width (W) of about 1 meter. While an exemplary embodiment is illustrated, number and quantity of inserts, cooling panels, and cooling channels are not limited. Dimensions of components are also not intended to be limited to those of the exemplary design. For example, the reactor and its components can be scaled according to needs for throughput, conversion of feed gas, and other process parameters as will be understood by those of skill in the art. Thus, no limitations are intended.

Figure 7:
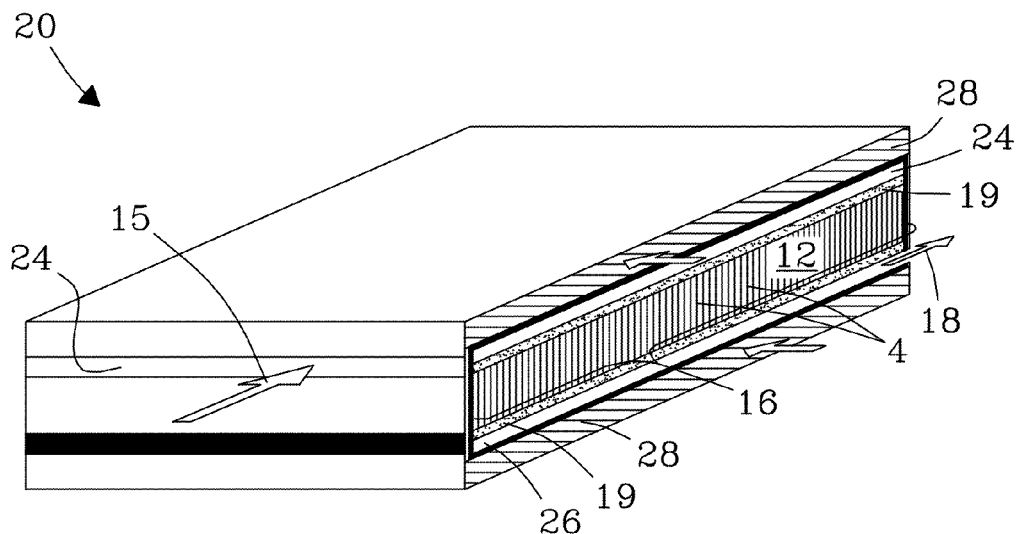
FIG. 7 shows a length-wise horizontal view of catalyst module insert of FIG. 6.

FIG. 7 shows a horizontal view of catalyst module insert 20 length-wise along the insert. Catalyst module insert 20 includes a structured monolith 12 (structured catalyst bed) with reaction cells 4 that include channels (FIG. 4a) coated with an FTS catalyst. Reaction cells 4 in structured monolith 12 collectively define a reaction zone 16 of the catalyst reactor, as described previously hereinabove. The catalyst module of the instant design converts a feed gas 15 or material to FTS reaction products 18 in a narrow distribution range. Feed gas 15 is introduced to the structured monolith 12 (catalyst bed) in a feed channel 24 that passes through a porous membrane 19 placed at one side of, or on both sides of, the structured monolith 12 which distributes feed gas uniformly into reaction cells 4 of reaction zone 16. Feed gas then flows through channels in the reaction cells where catalyst is present over the surface of the catalyst. Reaction products 18 exit reaction zone 16 in structured monolith 12 from the opposite end or side thereof and are collected in product channel 26 where they exit the reactor.

Figure 8:
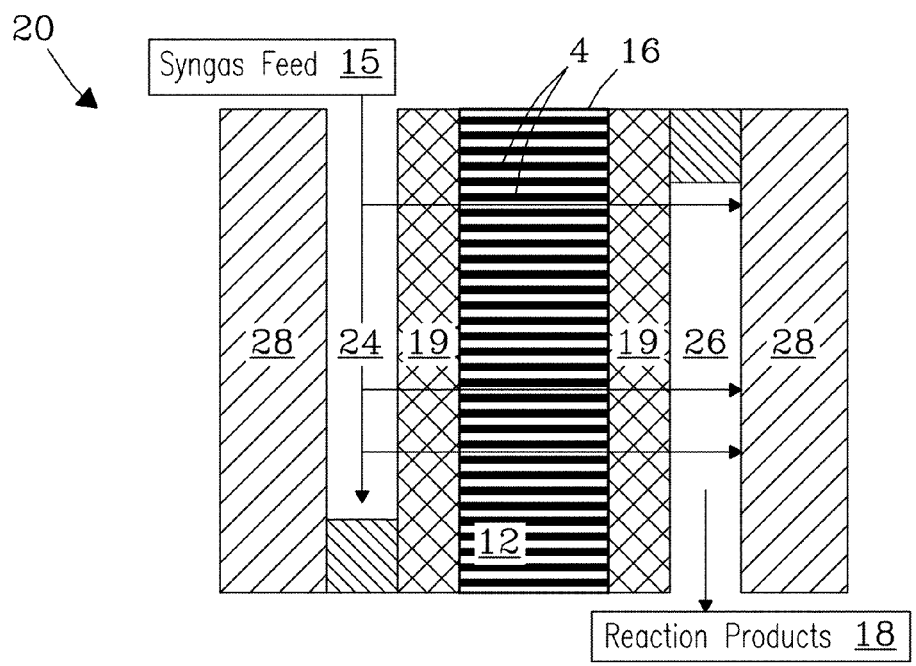
FIG. 8 shows another cross-sectional view of catalyst module insert along the length of the insert.

FIG. 8 shows another cross-sectional view of catalyst module insert 20 top to bottom along the length of insert 20. In the figure, insert 20 includes a structured monolith 12 with reaction cells 4 that include a catalyst. Reaction cells 4 in structured monolith 12 collectively define a reaction zone 16 or catalyst bed 16 of the reactor. Feed material 15 is introduced into feed channel 24 and distributed through a porous membrane 19 which is coupled to the structured catalyst bed 16. Membrane 19 distributes the feed material (e.g., syngas) into reaction zone 16 of the structured monolith 12, ultimately delivering feed material 15 uniformly into reaction cells 4. The reaction cells include channels (FIG. 4a) coated with an FTS catalyst, as described previously hereinabove. Reaction products 18 exiting the reaction channels pass through another porous membrane 19 (gas distributor 19) and are collected in product channels 26. Cooling panels 28 remove excess reaction heat from as reaction products 18 enter product channels 26 and provide temperature modulation from feed channels 24 if required.

Figure 9:
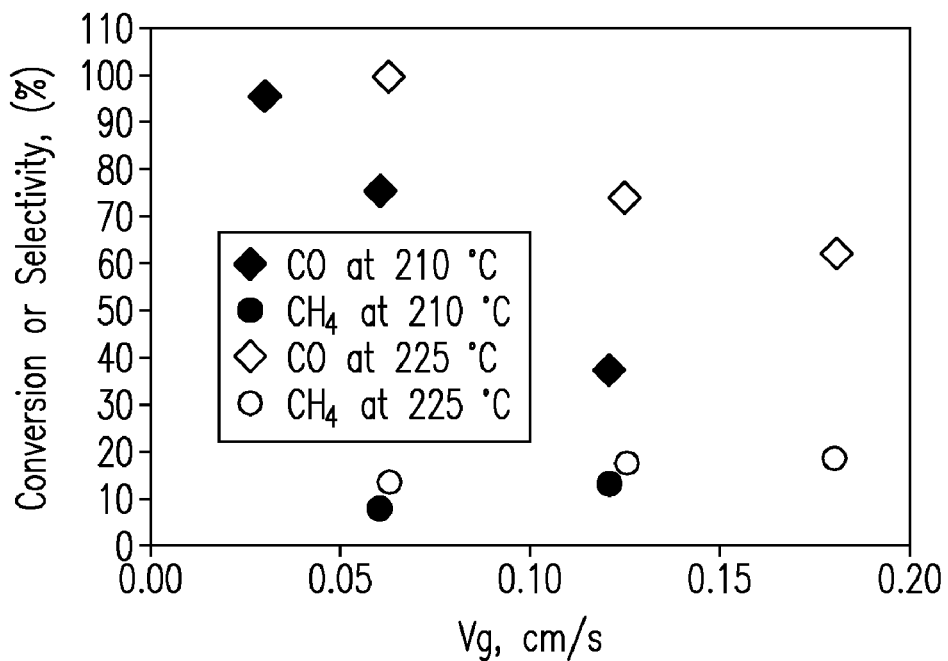
FIG. 9 is a plot that shows the impact of feed gas superficial linear velocity on CO conversion and $CH_4$ selectivity in a structured monolith catalyst reactor.

Impact of Feed Gas Superficial Linear Gas velocity ($V_g$) on Conversion and Methane Selectivity FIG. 9 shows the impact of feed gas (material) superficial linear velocity ($V_g$) (cm/s) on CO conversion and methane ($CH_4$) formation (selectivity) at a given catalyst loading in the channels of the structured catalyst. Feed gas included CO mixed with $H_2$ ($H_2$/CO ratio of 2) and at a reactor pressure of 25 bar (2.5 MPa). Data are presented for the structured catalyst at two temperatures (210° C. and 225° C.). Results demonstrate that for a given catalyst loading in the structured catalyst reactor, increasing the gas linear velocity decreases the residence time in the reactor which lowers CO conversion. The surprising result was confirmed again that methane ($CH_4$) selectivity (formation) increases with increasing values of ($V_g$). That is, a greater $CH_4$ selectivity is observed, even at the lower CO conversion values. These results show that control of flow conditions inside the channels of the structured monolith in the catalyst module is important. In general, gas superficial linear velocity is a critical parameter in the design of structured catalyst reactors.

Changing feed gas linear velocity has a different impact on the structured monolith catalyst bed compared to particle bed controls. In the structured monolith catalyst bed, methane selectivity increases while CO conversion decreases as the linear velocity is increased. At the same gas linear velocity, methane selectivity in a structured monolith bed is only slightly lower than in particle bed controls, even though the CO conversion is much higher. In particle bed controls, methane selectivity decreased with CO conversion as the gas linear velocity was increased. Again, CO conversion declines with increasing ($V_g$) due to a decreased residence time in the reactor. A surprising result was the observation that even at high CO conversion, with increasing values of ($V_g$), methane ($CH_4$) selectivity in the structured catalyst bed was lower than for controls. For the crushed catalyst particle bed, both CO conversion and methane selectivity decline with increasing gas linear velocity.

Impact of Flow Conditions (WHSV) of the Feed Gas on CO Conversion and Methane Formation Weight-hourly space velocity (WHSV) is commonly used to characterize the conversion activity of a catalyst material or a catalyst bed. The WHSV (in grams/grams/hr) can be calculated based on the net weight of catalyst, or total weight of the catalyst bed, as given by Equations [3] and [4]:

$$WHSV = \frac{F_{CO}}{W_{Cat}} \qquad [3]$$

-continued $$WHSV = \frac{F_{CO}}{W_{bed}} \quad [4]$$

In Equation [3], ($F_{co}$) is the CO mass flow rate (grams/hr) in the feed gas; ($W_{cat}$) is the net weight of catalyst contacted by the feed gas, i.e., catalyst weight absent any weight from the structured monolith. In Equation [4], ($F_{co}$) is the CO mass flow rate (grams/hr) in the feed gas; and ($W_{bed}$) is the weight of the catalyst bed contacted by the feed gas, i.e., catalyst weight plus weight of the structured monolith. A WHSV value calculated based on the active catalyst weight (e.g., catalyst metals+structured monolith or alumina support) from Equation [3] can be used to compare conversion results in different reactors for a given quantity of the active catalyst. WHSV values calculated based on the total weight of the structured catalyst bed (e.g., catalyst+structured monolith+ any inert monolith) can be used for comparison of results based on total weight of the structured catalyst bed. Because inactive substrate material can be used as a support material in the structured catalyst reactor, WHSV values calculated using Equations [3] and [4] can be different. Thus, in the present work, which WHSV value is specifically noted.

Impact of Flow Rates and Temperature on CO conversion and Methane Formation

Figure 10:
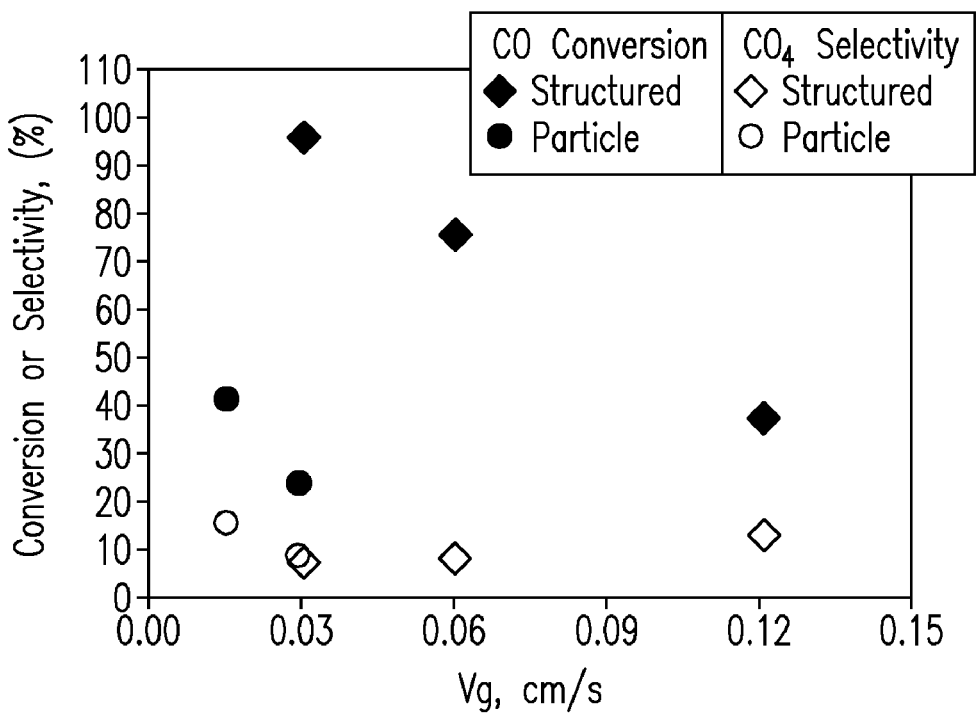
FIG. 10 compares CO conversion and methane formation in a structured monolithic catalyst reactor as a function of reaction temperature at a constant flow rate.

FIG. 10 compares CO conversion and methane formation in a structured monolithic catalyst reactor as a function of reaction temperature at a constant WHSV (flow rate). The catalyst module included a coating of CoRe/Al$_2$O$_3$ catalyst in the channels of the structured monolith. In the figure, data are presented at two flow rates. Here, WHSV is calculated based on total weight of the structured catalyst reactor bed (Equation [4]). Results show that there is no significant change in methane selectivity at different reaction temperatures at a constant WHSV or flow rate. In structured monolith catalyst reactors, low methane selectivity numbers are observed even at temperatures as high as 230° C. Results are attributed to proper contact between the gas/liquid/catalyst in the channels of the structured monolith, and efficient heat transfer (i.e., removal of heat) from the structured monolith, as well as the thin coating of FTS catalyst that reduces presence of hot spots in the catalyst and thus produces low quantities of methane.

Impact of Feed Gas Composition on CO Conversion and Methane Formation (Selectivity)

Figure 11:
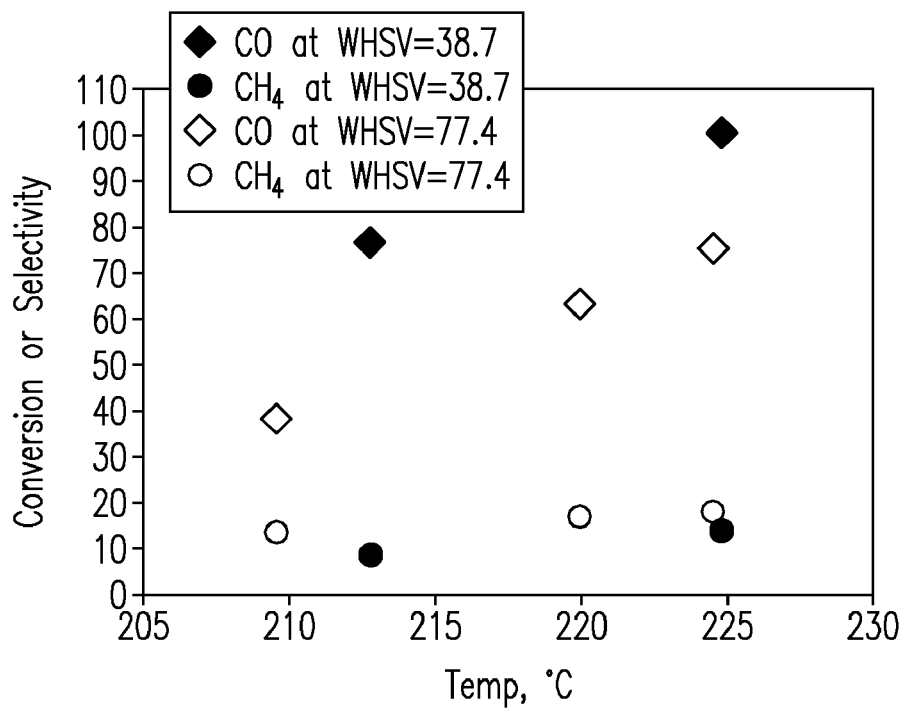
FIG. 11 shows the impact of feed gas composition on CO conversion and $CH_4$ selectivity in the structured catalyst reactor.

FIG. 11 shows the impact of feed gas (material) composition has on CO conversion and CH$_4$ selectivity. Feed gas included CO mixed with H$_2$ (H$_2$/CO ratio of 2) at a preselected pressure (P) of 25 bar (2.5 MPa), which was introduced at a constant weight-hourly space velocity (WHSV) of 22.4 per hour (hr) based on the catalyst bed weight. Results show that increasing the feed composition from 1.5:1 (H$_2$:CO) to 2:1 increases both the CO conversion and CH$_4$ selectivity, as would be expected. The H$_2$/CO ratio for stoichiometric FT reactions is generally 2. Thus, at this ratio, CO conversion can increase due to a sufficient supply of H$_2$. In contrast, at an H$_2$/CO ratio of 1.5, the FT reaction is starved of H$_2$, which decreases the CO conversion. The increase in methane selectivity is attributed to the increase in the gas flow linear velocity and CO conversion. Results for the structured monolith catalyst bed show that CH$_4$ selectivity remains at a low level of about 10%.

Impact of Reaction Pressure on CO Conversion and Methane Selectivity

Figure 12:
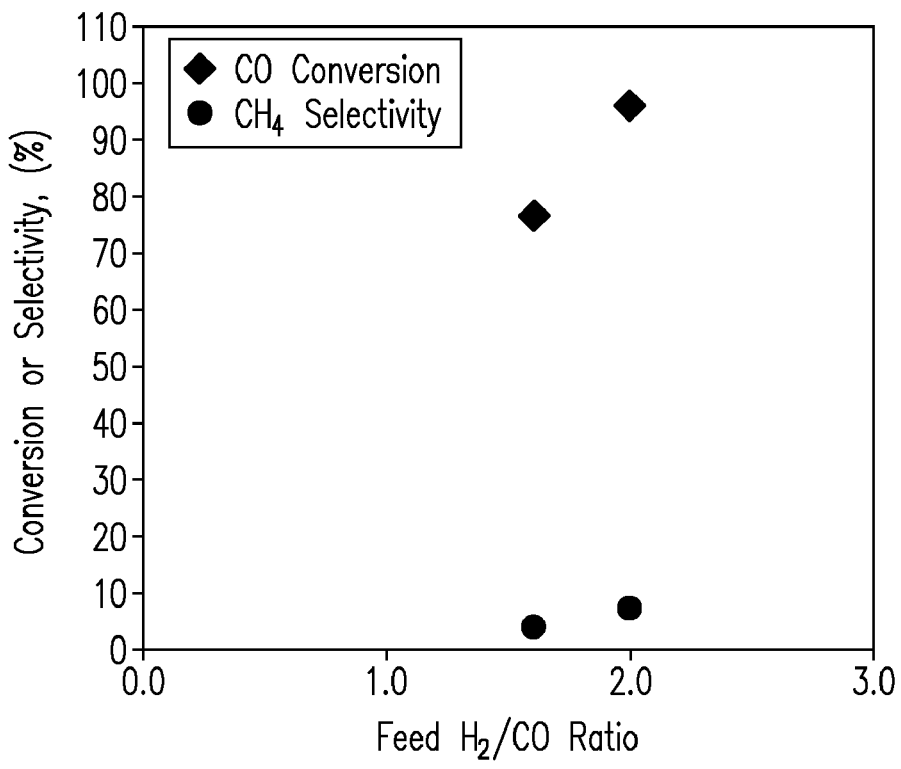
FIG. 12 shows the impact of reaction pressure on CO conversion and $CH_4$ selectivity in the structured catalyst reactor.

FIG. 12 shows the impact of reaction pressure on CO conversion and CH$_4$ selectivity in the structured catalyst reactor. Feed gas included CO mixed with H$_2$ (H$_2$/CO ratio of 2) that was introduced at different pressures under a constant weight-hourly space velocity (WHSV) of 111 (grams/grams/hr) based on the total weight of structured catalyst bed (see Equation [4]). Results show that increasing the reactor pressure decreases CO conversion and increases CH$_4$ selectivity, which was a surprising result. The instant results suggest that mass transport processes may not be rate-limiting in the channels of the structured monolith catalyst module in the reactor, which represents an advantage of the present invention over conventional reactors.

Figure 13:
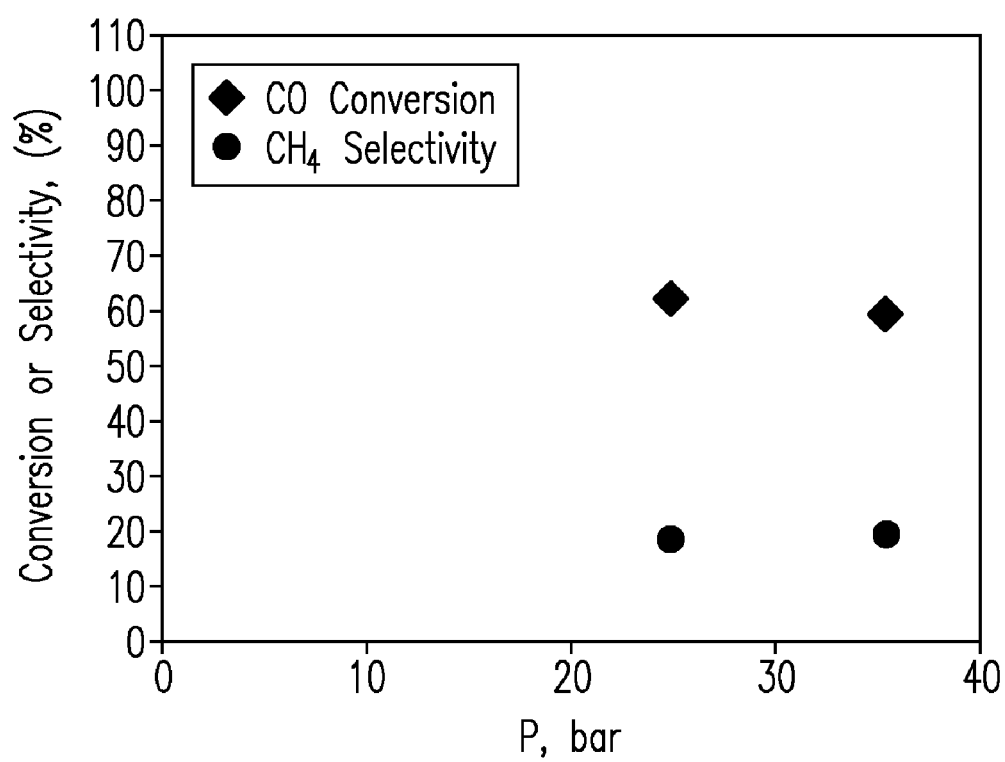
FIG. 13 shows the performance of a structured monolith catalyst reactor at a steady state reaction temperature as a function of flow rate compared to a control.

Performance of Structured Catalyst Reactor in CO Conversion and CH$_4$ Formation FIG. 13 shows the performance of a structured monolith catalyst reactor at a steady state reaction temperature (210° C.) as a function of flow rate (WHSV). Results were compared with a particle reactor (control) that was packed with particles made from the crushed structured monolith. Here, WHSV is based on the total weight in each of the structured catalyst bed. Dimension of the structured catalyst module in these tests was about 10-mm diameter and 100-mm in length. Temperatures at the top and bottom of the reaction zone of the catalyst bed module were consistent, with a typical temperature difference of less than about 2° C. In the figure, CO conversion and CH$_4$ formation (selectivity) data are shown. In the structured catalyst reactor, reactions quickly reach a steady state. CO conversion in the structured catalyst bed is dramatically higher than for the control (i.e., crushed particle bed). In particular, a very high CO conversion is achieved without excessive CH$_4$ production. Results show a CO conversion of nearly 95-98% was obtained with a CH$_4$ selectivity of about 10%. CO conversion decreases to about 76% when the weight-hourly-space-velocity (WHSV) is doubled (e.g., from 20 WHSV to 40 WHSV), while the CH$_4$ selectivity increases slightly. This result contrasts with the control bed which showed a decreasing CH$_4$ selectivity with decreasing CO conversion. A lower CO conversion is observed at a feed composition (H$_2$/CO) ratio of 1.6:1 due to insufficient H$_2$. Under the same reaction conditions, CO conversion increases by raising the H$_2$/CO ratio. Results demonstrate the feasibility of the structured monolith reactor design.

Figure 14A:
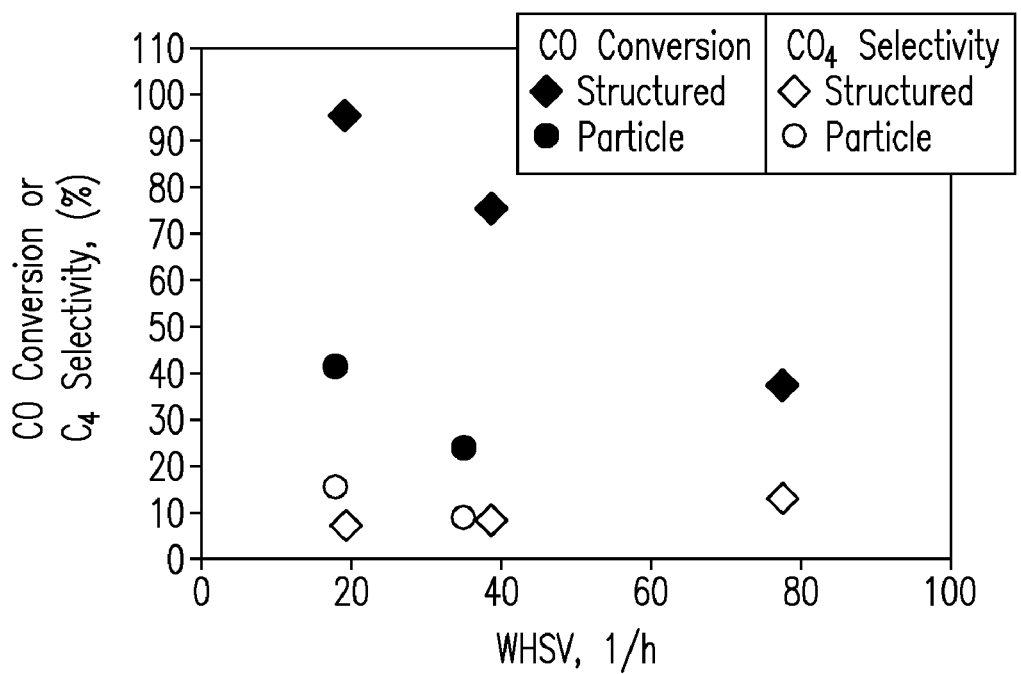
FIG. 14 shows the variation in CO conversion and methane selectivity with temperature at a constant flow rate in the structured catalyst reactor.
Figure 14B:
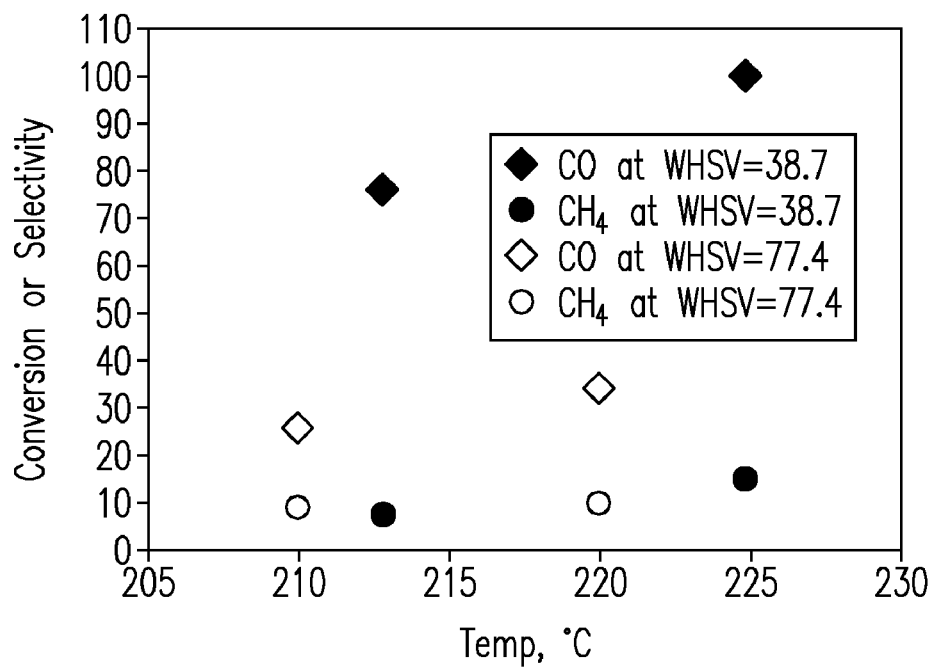

FIG. 14 compares CO conversion and methane formation in the monolithic catalyst reactor as a function of reaction temperature at constant WHSV. Here, WHSV is calculated based on the total weight of the structured catalyst bed of the reactor. Results show that under a constant WHSV, there was no significant change in methane selectivity at different reaction temperatures. Low methane selectivity numbers can be obtained using the structured monolith catalyst module even at temperatures as high as 230° C. Results are attributed to efficient contacting between gas, liquids, and catalyst in the structured channel, as well as efficient heat transfer that removes heat from the structured monolith and the thin coating of the FTS catalyst that reduces presence of hot spots in the structured monolith catalyst module and leads to low methane selectivity.

Figure 15:
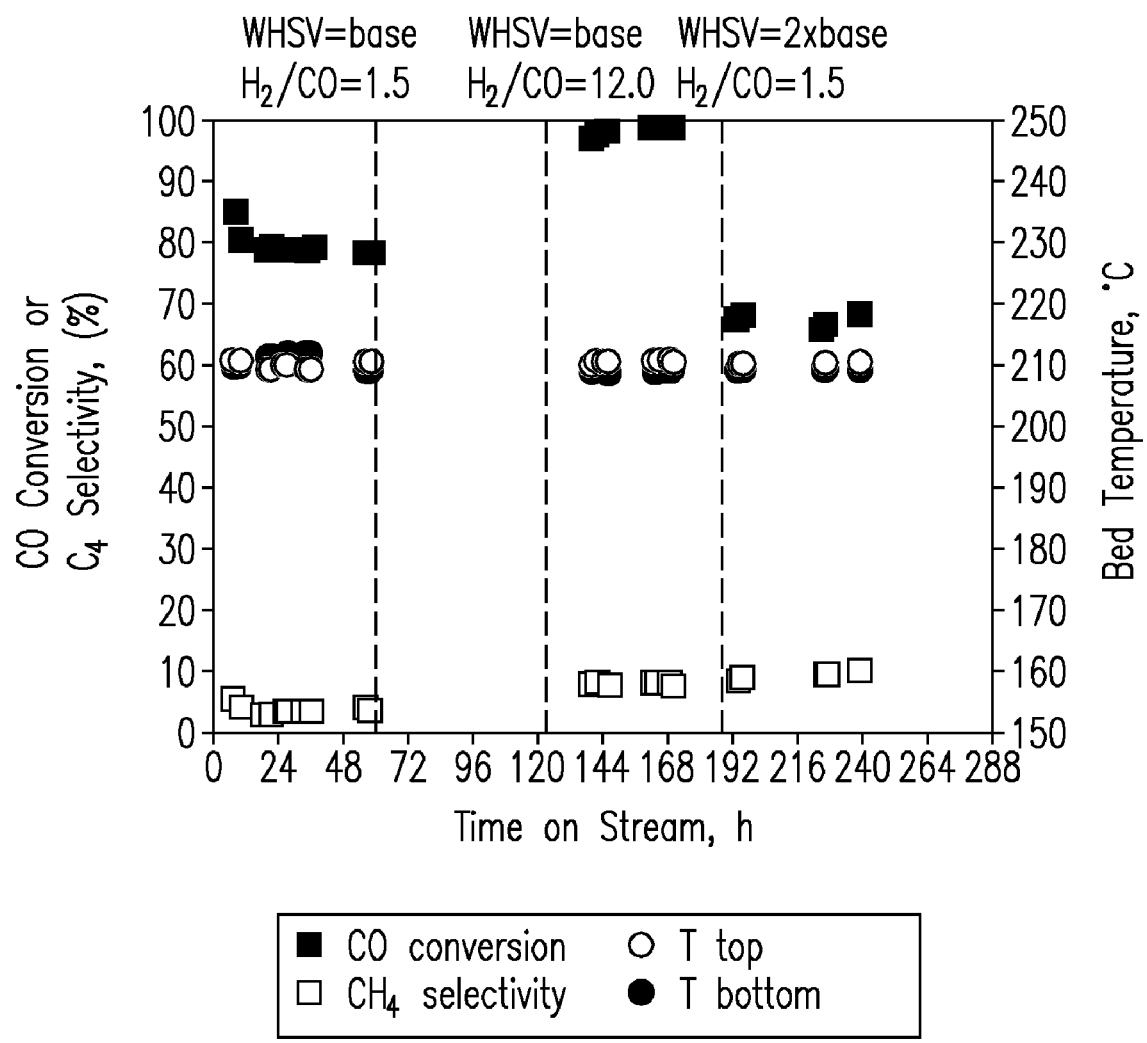
FIG. 15 shows the performance of a structured monolith catalyst bed reactor at a steady state reaction temperature as a function of flow rate compared to a control.

FIG. 15 compares CO conversion and methane formation for the structured monolith catalyst bed reactor as a function of reaction temperature against a particle bed control containing particles made of the crushed structured monolith) at two similar flow rates. Here, WHSV is calculated based on the weight of the catalyst bed. In the figure, CO conversion increases with temperature for both the structured and particle bed. However, at the same WHSV values, CO conversion in the structured monolith bed is dramatically higher than for the particle bed. Again, $CH_4$ selectivity in the structured catalyst reactor increases with temperature, but methane formation is low. This result contrasts with the control bed which showed a decreasing $CH_4$ selectivity with decreasing CO conversion.

Figure 16:
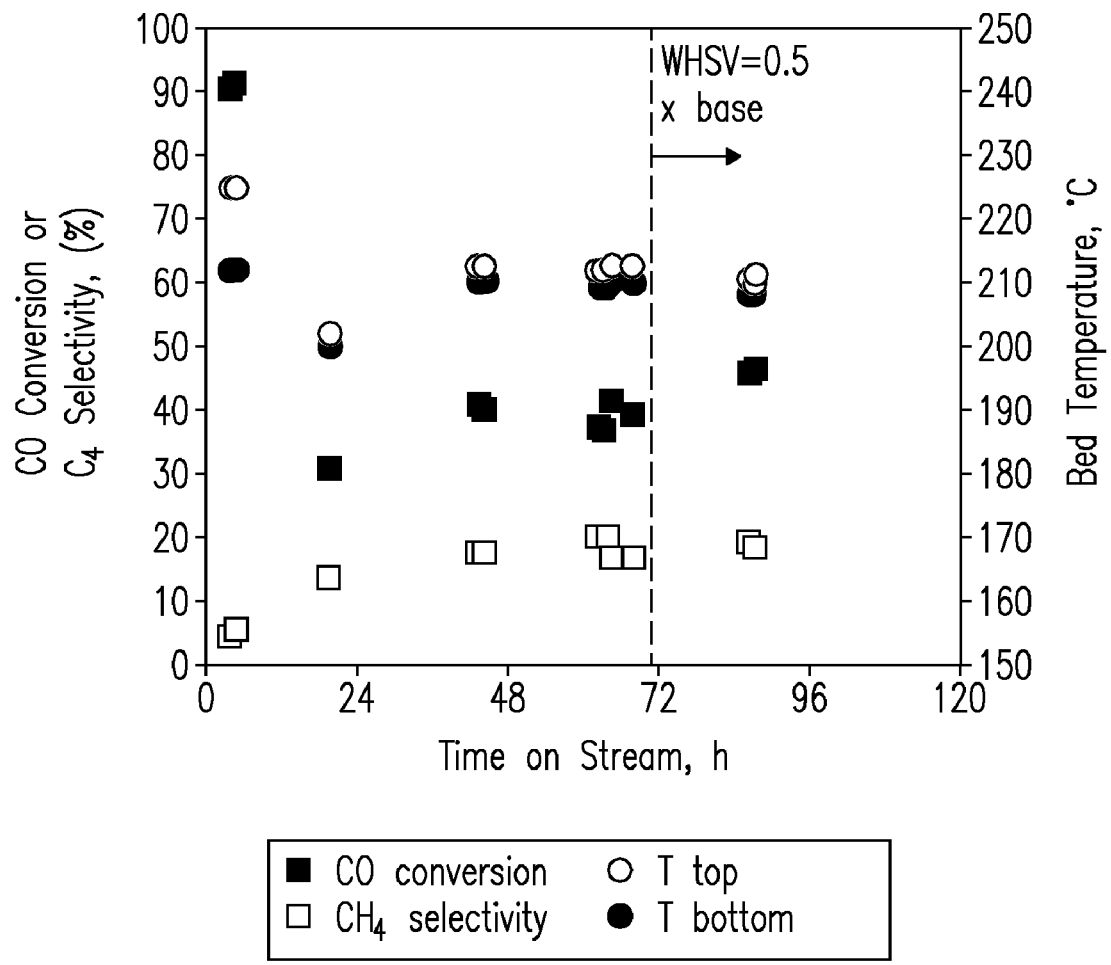
FIG. 16 shows the variation in reactor performance as a function of time on stream.

FIG. 16 shows the variation in performance of the structured monolith catalyst reactor as a function of time on stream. WHSV was held constant at 22.4; WHSV was based on the total weight of the structured monolith catalyst bed in the reactor. Dimension of the structured catalyst module in this test was about 10-mm diameter and 100-mm in length. Temperatures at the top and bottom of the catalyst bed module (reaction zone) were consistent, with a typical temperature difference of less than about 2° C. The reaction quickly reaches steady state. Very high CO conversion is achieved without excessive $CH_4$ production. A lower CO conversion at $H_2/CO$ of 1.5 is due to insufficient $H_2$ that starves the reaction of $H_2$. CO conversion increases by raising $H_2/CO$ ratio to a value of 2. Under these reaction conditions, CO conversion is nearly 95-98% and is obtained with a $CH_4$ selectivity of less than about 10%. Since CO conversion was so high, nearly all the feed gas was consumed. When the weigh-hourly-space-velocity (WHSV) was doubled, CO conversion decreased to about 67% while the $CH_4$ selectivity increased only slightly.

Results for the structured catalyst reactor were compared with a particle bed reactor as a control. The same structured catalyst was crushed and sieved to make 60-100 mesh particles, which was tested in a conventional packed bed reactor. The catalyst particle was diluted with SiC particles to enhance the thermal conductivity. Even with addition of small diameter SiC particles into the catalyst bed, control of the catalyst bed temperature was difficult due to exothermic reactions; temperature in the particle bed fluctuated significantly within the first two days of reactor operation. The particle reactor showed a start up at a temperature higher than the target of 210° C. and the temperature at the top of the bed was about 12° C. above that of the bottom at start-up. Top and bottom bed temperatures were controlled at a similar level after 2 days. CO conversion was about 40%, while $CH_4$ selectivity was as high as 20%. When the WHSV was reduced by half in an attempt to achieve a higher CO conversion, CO conversion only increased slightly to about 45%, which was substantially lower that was obtained with the structured bed. During the same reaction period, the catalyst in the particle bed showed significant deactivation during the CO conversion. By comparison, the structured monolith bed operated smoothly and quickly reached steady-state.

The present experimental results demonstrate the feasibility of the structured monolith catalyst reactor design and the observed trends provide insight that can be used to enhance additional designs of the structured monolith catalyst reactor. In general, results show the potential to achieve much better catalyst activity and $CH_4$ selectivity even with the same catalyst compositions.

The following examples are provided.

Example 1

Preparation of Structured Monolith Catalyst

Wet Slurry Method

Coating Method I

Acidic $\gamma$-$Al_2O_3$ (Engelhard Corp., Iselin, N.J., USA) with a mean particle size of 45 µm was pre-calcined at 500° C. in air for 2 hours. An aqueous solution of cobalt nitrate hexahydrate (98% purity, Sigma-Aldrich, St. Louis, Mo., USA) and perrhenic (rhenium source) acid (53.29 wt % PM, Engelhard Corp., Iselin, N.J., USA) was prepared. The mixed metal solution was sequentially co-impregnated onto the $\gamma$-$Al_2O_3$ particles three times using a multi-step incipient wetness method. Catalyst particles were dried after each impregnation in air at 90° C. for 8 hours, followed by calcination at 350° C. for 3 hours. The sequential impregnation yielded a final formulated catalyst with 20 wt % Co and 4.5 wt % Re on $Al_2O_3$. A catalyst coating slurry was then prepared by ball-milling the above Co—Re/$Al_2O_3$ catalyst particles in de-ionized water for 24 hours. Next, the structured monolith catalyst module was prepared using the catalyst particles prepared previously. A cordierite monolith substrate with a cell density of 400 cpsi (# cells per $in^2$) with 1-mm square channels was used, but is not limited. The monolith test pieces were core-drilled in a cylindrical shape from a full-size, oval-shaped monolith block of about 5" diameter. In a first coating method, the coating slurry was introduced at the top of the structured monolith, which flowed down through the channels of the monolith uniformly by gravity. A coating layer was formed on the channel wall as the coating solution flowed through. Excess coating solution was blown out by forced air.

Example 2

Preparation of Structured Monolith Catalyst

Wet Slurry Method

Coating Method II

Monolith, catalyst particles, and catalyst slurry were prepared as in EXAMPLE 1. The structured monolith was coated with catalyst by introducing the coating slurry at the bottom of the monolith substrate, which was pulled upward through the channels of the monolith under vacuum applied across the top of the monolith. After the monolith was completely soaked by the coating slurry for about one minute. Excess coating slurry was removed by centrifuging. The resulting, wetted monolith was dried at 110° C. for 6 hours, and calcined at 350° C. for 1 hour to affix the coating as a catalyst layer on the monolith substrate. The monolith support was a cordierite support with a cell density of 400 cpsi (#/$in^2$) of 1-mm square channels. The monolith test pieces in cylindrical shape were core-drilled out of a full-size, oval-shaped monolith block. A catalyst coating slurry was prepared by ball-milling the above Co—Re/$Al_2O_3$ catalyst particles in de-ionized water for 24 hours. The slurry was coated on the channel surface of the monolith support, dried at 110° C. for 6 hours, and calcined at 350° C. for 1 hour. A control catalyst bed was prepared by crushing a structured catalyst into particles. Particles were sieved to 60-100 mesh for the particle bed.

Example 3

Testing of Structured Monolith Reactors with Different Catalyst Loading Values

Weight fraction of $C_5$-$C_{18}$ hydrocarbons obtained in total liquid hydrocarbon products from conversion of CO at different reaction temperatures in a structured monolith catalyst reactor (FIG. 3) was compared with results to a (particle bed) control. Three different catalyst loadings were tested for FT reactions with the catalysts prepared from Example 1. In a first test of a structured monolith catalyst, the monolith ceramic piece was core-drilled to a size close to the diameter of the reactor tube (7.9-mm I.D.), fully loaded with catalyst, wrapped with a thin layer of ceramic wool, and plugged tightly into the reactor tube. The structured monolith had a catalyst layer thickness of 11 μm. In a second test of the monolith, 16 well-defined channels were introduced in the middle of the monolith piece and then loaded with catalyst. The structured monolith included a catalyst layer thickness of 6 μm. Channels not coated with catalyst were plugged at both ends with cement. The monolith piece was placed inside the reactor tube, and the gap between the monolith and reactor tube was plugged at the top with ceramic cement so that feed gas flowed through catalyst coated channels that included the catalyst. The reactor tube was vertically oriented and a down flow of feed gas was used. For the particulate catalysts, a reactor tube of small ID (7.9-mm) was used and the catalyst particles were packed in the middle of the reactor tube. A thermocouple well was placed at the top of the catalyst bed. The reactor tube was wrapped using a silicone oil jacket (about 10" length) to control the reactor temperature.

Olefin/Paraffin Ratio, Alpha Number, and Product Distribution

Detailed liquid product analyses were carried out to obtain olefin/paraffin (O/P) ratios and alpha (α) numbers. At 210° C., the monolithic catalyst reactors exhibited a unique narrow product distribution compared to the powdered catalyst (PWD), with over 95 wt % of the liquid hydrocarbons having a chain length of from $C_5$-$C_{18}$. Products consisting mainly of straight-chain paraffins that can be easily refined into high quality gasoline and diesel. At the same temperature (210° C.), lower methane selectivity was also obtained on the monolithic catalysts, which was attributed to a lower local $H_2$/CO ratio on the monolithic catalyst. Under FT synthesis (FTS) conditions, internal pores (channels) within the catalyst are normally filled with liquid hydrocarbons, through which hydrogen has a much higher diffusivity than CO. The thin catalyst layer in the monolithic catalyst module described herein may result in a lower relative $H_2$ concentration within the catalyst locally, thereby minimizing selectivity to methane. TABLE 1 presents alpha numbers for liquid products obtained using the structured monolithic catalyst and reactors against a powder catalyst control.

TABLE 1

Olefin to paraffin ratio (O/P) and alpha numbers measured for monolithic catalysts (CoRe/Al₂O₃, T = 210° C., P = 2.5 MPa, WHSV = 2.75 $g_{CO}$/$g_{cat}$/hr) compared to a powdered control.

|  | Olefin/Paraffin ratio (wt/wt) | Alpha (α) number |
|---|---|---|
| Monolith #1 | 0.26 | 0.72 |
| Monolithic #2 | 0.40 | 0.71 |
| Control | 0.05 | 0.86 |

In TABLE 1, at 210° C., alpha numbers obtained from both monolithic catalysts are lower than the control. In general, alpha numbers above about 0.9 are considered to be representative of wax-producing processes. That is, the greater the alpha number, as the alpha number approaches 1.0, the greater selectivity there is in a process for producing wax molecules Wax molecules are defined as hydrocarbons that are in a solid form at room temperature. Waxes include linear hydrocarbon molecules with a carbon number >28. Results show the low alpha number is consistent with the observed shift in product distribution towards lower chain length carbons. At an alpha number of 0.7, for example, essentially no waxes were observed in the liquid products. In addition, O/P ratios were higher on the monolithic catalysts. This result suggests olefins may tend to desorb more easily on monolithic catalysts. Desorption of olefins on monolithic catalysts presumably causes reduction in surface concentration of olefinic intermediates responsible for chain growth. Therefore, product distribution shifts towards the light hydrocarbons (i.e., $C_5$-$C_{18}$ range). A change in product distributions was also observed at elevated temperatures. As temperature increases from 210° C. to 220° C., conversion increases, although the difference in the fraction of $C_5$-$C_{18}$ hydrocarbons tends to diminish in the presence of the monolithic catalysts. Results are likely due to the fact that, at higher conversion, sweep gas (e.g., product gases CO, $CO_2$, $CH_4$) is too slow, permitting liquid product films to build up on the catalyst surface, thus making desorption of olefins more difficult. Liquid product film thickness is dependent on temperature and gas linear velocity. Thus, by increasing reaction temperature and feed rate, it is expected that liquid film thickness can be reduced dramatically, and product distribution can be shifted back to light hydrocarbons. TABLE 2 presents alpha numbers and fraction of C5-C18 hydrocarbons (HCs) in the liquid hydrocarbon products from conversion of the feed on the monolithic catalyst.

TABLE 2

Effect of temperature and WHSV on the product distribution on monolithic catalyst (CoRe/Al₂O₃, 2.5 MPa).

|  | 220° C. WHSV = 2.75 g CO/g cat/hr | 240° C. WHSV = 11.0 g CO/g cat/hr |
|---|---|---|
| Conversion, (mol %) | 63.8 | 30.0 |
| Alpha number (α) | 0.87 | 0.79 |
| Fraction of $C_5$-$C_{18}$ in total liquid HCs, (wt %) | 75.0 | 84.0 |

In TABLE 2, when catalyst temperature was increased to 240° C., and WHSV was increased from 2.75 to 11.0 g CO/$g_{cat}$/hr, fraction of $C_5$-$C_{18}$ increased. This result is consistent with the observed decrease in alpha number from 0.87 to 0.79. Lower conversion at 240° C. allows a high sweeping rate, which results in reduction of the thickness of liquid film. The narrow product distribution obtained suggests it may be possible to use a very mild hydrocracking process or eliminate use of a hydrocracker altogether, thereby reducing capital costs in down-stream reactors/separators.

Example 4

Preparation of Structured Monolith Catalyst Module

2-Step Wash-Coating Method

Method III

Example 4 describes a 2-step process of preparation of the structured monolith catalyst starting from catalyst support materials. This procedure minimizes loss of catalyst metals during the coating process and is flexible to choices of catalyst metals for loading into the structured monolith catalyst module.

Alumina coating slurry preparation. A coating slurry was prepared using 325 mesh (<45 μm) acidic $Al_2O_3$ powder (Engelhard). $Al_2O_3$ powder (~29 wt %) was mixed in water initially. Then, ~0.2 wt % of polyacrylic acid (PAA) with molecular weight of 2000 g/mol (Sigma-Aldrich, St. Louis, Mo., USA) was added as an electrostatic dispersant. The pH was adjusted to a value in the pH range from 3-4 by addition of $HNO_3$. Then, ~1 wt % of a poly(vinyl) alcohol (PVA) (Sigma-Aldrich, St. Louis, Mo., USA) with a molecular weight of from 8,000-10,000 g/mol was added as a binder. About 0.1 wt % of a non-ionic surfactant [e.g., IGEPAL® CO-720 (Sigma-Aldrich)] solution was added as a surfactant. About 1 wt % polyethylene glycol (PEG) (Sigma-Aldrich) with molecular weight of 2000 g/mol was used as a plasticizer. Slurry was ball milled for 16-48 hrs.

Coating procedure. The monolith testing samples of about 10 mm in diameter and 10-mm in length, core-drilled out of the same monolith block as used in Example 1, was mounted onto the coater apparatus. The coating slurry was introduced from the bottom of the monolith by pulling vacuum of 40-50 kPa on the top. The coating slurry flow was stopped as soon as the top of the monolith was completely immersed by the slurry. After the monolith was soaked for a short time (e.g., 30 seconds), the monolith piece was removed from the coater. The excessive solution in the channel was removed by either centrifuging at 1000 rpm or air blow. The wetted sample was dried at 100° C. for overnight. The coating and drying procedures were repeated for three times. The final sample was calcined at 550° C. for 4 hours at 5° C./min ramp rate. Resulting monolith test samples had an alumina loading that ranged from 18 wt % to 19 wt %, which showed good consistency.

Catalyst Loading. Alumina-coated monolith samples were loaded with catalyst using an impregnation method. An aqueous solution of cobalt nitrate hexahydrate (98% purity, Aldrich) and perrhenic acid (Engelhard 52.09 wt % PM) and Lanthanum nitrate hydrate was prepared for the impregnation. The impregnation procedure consisted of: (i) fully immersing the monolith in the catalyst solution; (ii) pulling vacuum (e.g., for a few minutes) to drive out gas bubbles; and (iii) removing excess solution in the channels of the monolith and support wall by centrifuging. After impregnation, catalyst introduced to the channels of the catalyst module was dried in air at 90° C. for overnight followed by calcination at 350° C. for 3 hours. TABLE 3 lists the loading values for alumina and catalyst in the structured catalyst prepared by the 2-step catalyst loading procedure.

TABLE 3

Catalyst loading in structured monolith samples prepared by 2-step impregnation procedure.

| Monolith # | $Al_2O_3$ loading on monolith, (Wt %) | FT catalyst loading on monolith, (Wt %) | Co | Re | La |
| --- | --- | --- | --- | --- | --- |
| A | 18% | 23.4% | 17.3% | 3.2% | 2.9% |
| B | 19% | 24.9% | 18.4% | 3.4% | 3.1% |
| C | 19% | 23.5% | 17.4% | 3.2% | 2.9% |
| F | 20% | 24.6% | 18.2% | 3.3% | 3.1% |

Example 5

Reactor Loading and Testing of Structured Monolith Catalysts

A structured monolith catalyst module was prepared as described in EXAMPLE 2. The module included two pieces of structured monolith, one atop the other, each coated with FT catalyst. The module was loaded into a stainless steel reactor tube with an inner diameter of about 10-mm (FIG. 3). Fit of the monolithic catalyst in the tube was sufficient to generate a gap between channels on the exterior edge of the monolith and the reactor tube wall surface that was less than the size of the channels. The packing provided a uniform flow distribution of feed gas over the cross-sectional area of the structured monolith catalyst modules. Bottom and top of the monolith catalyst module (bed) was supported by a metal spring that held the monolith catalyst module in place. A thermocouple was placed at the top and bottom of the monolith catalyst bed along the centerline, about 5-mm away from the monolith surface. The reactor tube was sheathed in an oil jacket with a length that was sufficient to cover the entire length of the catalyst bed, about 10", but is not limited thereto. A continuous silicone oil flow was introduced into the shell side of the reactor tube to control reaction temperature of the catalyst bed. Silicone oil was circulated between the reactor and an oil source (e.g., an oil bath) (FIG. 2). The reaction temperature was controlled by adjusting the oil bath temperature and circulation flow rate. The structured catalyst reactor was pressure tested to ensure no gas leakage. Catalyst was then activated by reduction in hydrogen at about 400° C. for 12 hours at 0.1 MPa pressure at a temperature ramp rate of 1° C./min under a flow of hydrogen gas flowing at a rate of 100 sccm. After reduction, reactor temperature was cooled to 160° C. under a continuous flow of hydrogen, and then pressurized to a desired pressure of about 5% $H_2$ in helium. When the reactor temperature and pressure were stabilized, a syngas stream was introduced and the feed gas (syngas) material was preheated. Then, the catalyst bed temperature was slowly increased to the desired reaction temperatures, e.g., 210° C. by adjusting the silicone oil temperature and preheating temperature. Reaction products exited from the bottom of the reactor tube. The liquid phase was condensed from the reactor effluent in a chilled vessel at the reaction pressure. The liquid phase was comprised mostly of water and hydrocarbon. The remaining gas stream, consisting essentially of inert gases and hydrocarbons with a small carbon number, was measured at its flow rate and sampled for GC analysis. Control tests were repeated in a particle bed reactor loaded with particles made from identical structured monolith catalysts that were crushed and sieved into 60-200 mesh particles. Catalyst particles were calcined in 2% $O_2/N_2$ in 100 sccm at 1° C./min to 400° C. and 4 hours at 400° C. to remove residual coke. Rejuvenated catalyst particles were loaded into the same reactor tube as used in Example 5. Catalyst particles were diluted with SiC particles at a weight ratio of about 60% SiC and 40% catalyst particles and used to better control and monitor catalyst bed temperature. Catalyst was activated and tested as described hereinabove. Time on steam conversion and selectivity data were calculated based on product gas analysis for CO, $CO_2$, $CH_4$ and $C_2$ gases. 3-4 vol % Argon gas was introduced into the reactor with the syngas as an internal standard. Condensed liquid products were analyzed in a HP 6890 gas chromatograph (Hewlett Packard, Palo Alto, Calif., USA) connected to a DB-5 column (Agilent, Santa Clara, Calif., USA). Compositions of the non-condensed gases were analyzed using an on-line gas chromatograph (Agilent QUADH G2981A with Molsieve 5 A, PoraPlol Q). Olefinic compounds were identified using a GC-MS (HP 5973C) system, then quantified using a GC (HP 6890).

CONCLUSIONS

Monolithic catalysts were found to be more active than powder catalysts. In addition, fraction of $C_5$-$C_{18}$ in the total liquid hydrocarbon product is enhanced dramatically on monolithic catalysts at a relatively low conversion level. Alpha numbers and olefin/paraffin ratios obtained from monolithic catalysts support the mechanisms of reduced re-adsorption of olefins on the monolith catalysts, leading to a narrow product distribution. Control of olefin re-adsorption (e.g., by tuning catalyst coating thickness) appears to be important in achieving a desired product distribution.

This study presents an important finding about the structured catalyst/reactor system, in that the product distribution highly depends on how the structured reactor is set up. Even if a catalyst is tested under identical reaction conditions (T, P, $H_2$/CO ratio), hydrodynamics (or flow conditions) inside a structured channel may have a significant impact on the product distribution. FT product distributions are significantly affected by choice of catalyst structure and hydrodynamic flow conditions. Higher C5-C18 liquid fractions and olefin/paraffin ratios are obtained by conducting the FT reaction in a monolith catalyst channel rather than a packed catalyst particle bed. Wax formation is mainly caused by secondary reactions in a stagnant liquid. The straight flow channels of a monolith catalyst provide little dead volume and render quick flushing of the liquid product by convective flow so that the wax formation can be minimized or eliminated. Methane formation in the FT reaction is likely due to dry catalyst surface. The fraction of the dry catalyst surface in a monolith channel is affected by the G/L hydrodynamics inside the channel under the reaction conditions. Methane formation can be decreased by assuring complete wetting of the catalyst surface at the selected reaction conditions.

We claim:

1. A modular catalyst reactor comprising:
a feed gas channel defining a feed gas inlet disposed between a cooling panel and a gas distributor, the gas distributor comprising a porous membrane with pores of a preselected size disposed adjacent a modular structured catalyst bed, the catalyst bed including at least one monolithic insert defining a reaction zone having a preselected density of open-ended channels therein, each channel including a wall comprising a syngas conversion catalyst of a selected thickness and pore structure, the gas distributor configured to distribute said feed gas into the reaction channels of the catalyst bed at a selected linear gas velocity in a direction orthogonal to the flow of feed gas entering the reactor that fields selected reaction products therein.

2. The catalyst reactor of claim 1, wherein said monolithic inserts comprise an inert ceramic support with a coating of said catalyst thereon.

3. The catalyst reactor of claim 1, wherein said catalyst is a component of the wall of the channel.

4. The catalyst reactor of claim 1, wherein said catalyst is a Co—Re catalyst on alumina.

5. The catalyst reactor of claim 1, wherein said catalyst bed includes two or more monolithic inserts.

6. The catalyst reactor of claim 1, wherein each of said inserts includes at least one cooling panel operatively coupled to an external surface thereof that provides cooling of said surface.

7. The catalyst reactor of claim 1, wherein said inserts include a porous membrane on one side or two sides thereof to distribute feed as into same or Fischer-Tropsch synthesis reaction products therefrom.

8. The catalyst reactor of claim 1, wherein said preselected density is a density of from about 100 channels per square inch to about 2000 channels per square inch.

9. The catalyst reactor of claim 1, wherein the reactor is configured to introduce feed gas into channels of the catalyst bed at a superficial gas linear velocity below about 0.2 cm/sec.

10. The catalyst reactor of claim 1, wherein the gas distributor is a porous metal sheet.

11. The catalyst reactor of claim 1, wherein the gas distributor provides a uniform flow of feed gas into the channels of the catalyst bed of the reactor.

12. The catalyst reactor of claim 1, wherein the catalyst bed has a thickness between about 1 cm and about 20 cm or greater.

13. The catalyst reactor of claim 1, wherein channels of the catalyst bed are oriented in a direction that provides gravity flow.

14. The catalyst reactor of claim 1, further including a channel defining a reaction product outlet disposed between the modular catalyst bed and a cooling panel on a side of the reactor opposite the feed gas channel inlet that delivers reaction products out of the reactor.

* * * * *

UNITED STATES PATENT AND TRADEMARK OFFICE
CERTIFICATE OF CORRECTION

| | |
|---|---|
| PATENT NO. | : 8,101,140 B2 |
| APPLICATION NO. | : 12/393837 |
| DATED | : January 24, 2012 |
| INVENTOR(S) | : Wei Liu and Yong Wang |

Page 1 of 1

It is certified that error appears in the above-identified patent and that said Letters Patent is hereby corrected as shown below:

On the Title Pg Item (75) Inventors: Reverse order of inventors to show them in the following order, 1. Wei Liu
2. Yong Wang Col. 22, Line 2: Replace "fields" with "yields"

Col. 22, Line 19: Replace "as" with "gas"

Signed and Sealed this
Twenty-seventh Day of March, 2012

David J. Kappos
*Director of the United States Patent and Trademark Office*